(12) United States Patent
Hata et al.

(10) Patent No.: US 8,737,227 B2
(45) Date of Patent: May 27, 2014

(54) PACKET TRANSMISSION DEVICE, MEMORY CONTROL CIRCUIT, AND PACKET TRANSMISSION METHOD

(75) Inventors: Akihiro Hata, Kawasaki (JP); Atsushi Kitada, Kawasaki (JP); Yuji Ikegami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 13/555,809

(22) Filed: Jul. 23, 2012

(65) Prior Publication Data
US 2013/0028082 A1    Jan. 31, 2013

(30) Foreign Application Priority Data

Jul. 25, 2011   (JP) .................................. 2011-162632

(51) Int. Cl.
*G08C 15/00*   (2006.01)

(52) U.S. Cl.
USPC .......................................... 370/236; 370/412

(58) Field of Classification Search
USPC ................... 370/235–238, 412, 419
See application file for complete search history.

(56) References Cited

U.S. PATENT DOCUMENTS

| | | | |
|---|---|---|---|
| 8,130,648 B2 * | 3/2012 | Kwan et al. ................... | 370/235 |
| 8,320,240 B2 * | 11/2012 | Kwan et al. ................... | 370/229 |
| 2007/0294435 A1 * | 12/2007 | Huang et al. .................. | 709/251 |
| 2008/0159129 A1 * | 7/2008 | Songhurst et al. ............ | 370/229 |
| 2009/0190470 A1 | 7/2009 | Hinosugi et al. | |
| 2010/0278190 A1 * | 11/2010 | Yip et al. ...................... | 370/412 |

FOREIGN PATENT DOCUMENTS

| | | |
|---|---|---|
| JP | 2005-123919 | 5/2005 |
| JP | 2005-244417 | 9/2005 |
| JP | 2009-182546 | 8/2009 |

\* cited by examiner

*Primary Examiner* — Kerri Rose
(74) *Attorney, Agent, or Firm* — Staas & Halsey LLP

(57) ABSTRACT

A packet transmission device includes a buffer stores packet data in any of queues, a queue manager outputs queue-status signals indicating whether or not transmittable packet data exists in the corresponding one of the queues, a bandwidth controller outputs token-status signals indicating whether or not an amount of the tokens accumulated at a certain period for the corresponding queue is larger than a token threshold provided for the corresponding queue, a queue selector preferentially selects any queue whose duration time of a transmittable state in which the corresponding queue status signal indicates that transmittable packet data exists in the corresponding queue and the corresponding token-status signal indicates that the amount of the accumulated tokens is larger than the token threshold provided for the corresponding queue is greater than a duration-time threshold provided for the corresponding queue, and a buffer reader controls reading of the packet data from the selected queue.

15 Claims, 17 Drawing Sheets

PACKET TRANSMISSION DEVICE, MEMORY CONTROL CIRCUIT, AND PACKET TRANSMISSION METHOD

CROSS-REFERENCE TO RELATED APPLICATION(S)

This application is based upon and claims the benefit of priority of the prior Japanese Patent Application No. 2011-162632, filed on Jul. 25, 2011, the entire contents of which are incorporated herein by reference.

FIELD

The embodiments discussed herein are related to a packet transmission device, a memory control circuit, and a packet transmission method.

BACKGROUND

In a network in which packets are transmitted, bursty occurrence of a large amount of traffic at a terminal, streams of traffic merging at a relay node, and factors such as a communication speed of a relay line may produce traffic having a large transmission bandwidth or large burstiness (i.e., a large amount of data being burst-transferred). For traffic having an excessively large transmission bandwidth or the burstiness, the amount of packet data transferred in a certain period of time exceeds the processing capability of a transmission device that relays the packet data or a terminal that receives the packet data, thus causing a problem in that that some of the packets to be transmitted are discarded.

In order to inhibit occurrence of traffic having such an excessively large transmission bandwidth or burstiness, packet transmission devices (such as shapers) having bandwidth control functions have been available. For the bandwidth control, token control using tokens, which are pieces of information for determining whether or not outputting of packets is to be permitted, is widely used. In the token control, the tokens are used to perform control for limiting the transmission bandwidth or the size of burstiness of traffic to be transferred.

Even for streams of traffic to be output to the same physical line, there are cases in which the streams of traffic are classified into groups according to logical units, such as destination devices, user groups, or the like to perform bandwidth controls for the traffic groups. In such a case, the traffic groups are assigned corresponding queues, on which the bandwidth controls are performed respectively. A scheme using a method called Round Robin (RR) has been widely used to ultimately selecting, from multiple queues in which outputting of packets is permitted, a queue from which the packets are to be output.

FIG. 1 is a block diagram illustrating one example of the internal configuration of a packet transmission device having a bandwidth control function.

A packet buffer 106 has therein a data storage region, which is logically divided into multiple queues. In accordance with the traffic group to which a packet belongs, the packet buffer 106 stores the packet data in any of the multiple queues.

A queue manager 104 manages the queues in the packet buffer 106, determines whether or not packet data are stored in the queues, and outputs multiple queue-status signals on the basis of the results of the determinations.

A buffer read controller 102 includes a packet-data reader 108, a bandwidth controller 110, and a queue selector 112.

Under the control of a token controller 114, the bandwidth controller 110 uses token counters 120 (120-1 to 120-$n$, $n$ represents the number of queues) to add and accumulate, for each queue, tokens at a certain period in accordance with an added-token value stored in a token table 116. A maximum-value table 118 stores the maximum values (i.e., maximum token values) of the amounts of tokens that can be accumulated for the respective queues. The token controller 114 determines, for each queue, whether or not the amount of accumulated tokens (i.e., an accumulated-token value) is larger than or equal to a predetermined threshold (e.g., 0 (zero)). On the basis of the results of the determinations, the token controller 114 outputs token-status signals.

The queue selector 112 receives the queue-status signals from the queue manager 104 and also receives the token-status signals from the bandwidth controller 110. A status monitor 122 in the queue selector 112 determines, for each queue, whether or not it contains packets and is in a state in which the amount of accumulated tokens is larger than or equal to a predetermined threshold (i.e., is in a transmittable state), on the basis of the corresponding queue status signal and the corresponding token-status signal. On the basis of the result of the determination of the status monitor 122, a queue selection controller 124 selects, from the multiple queues, the queue in the transmittable state as a transmission source and generates identification information of the selected queue (selected-queue identification information).

The queue manager 104 receives the selected-queue identification information from the queue selection controller 124. On the basis of the received packet identification and packet information contained therein, the queue management section 104 generates read-address information of the selected queue.

The packet-data reader 108 receives the selected-queue read-address information from the queue manager 104. On the basis of the received selected-queue read-address information, the packet-data reader 108 reads the packet data from the selected queue in the packet buffer 106 and outputs the read packet data.

In addition to the method based on the token control, other bandwidth control methods are also available. For example, Japanese Laid-open Patent Publication No. 2009-182546 discloses a method in which an available bandwidth is calculated based on a maximum bandwidth, a minimum bandwidth, and a weighting for each queue and a transmission schedule time is further managed to determine from which queue packets allocated therein are to be transmitted with high priority. Japanese Laid-open Patent Publication No. 2005-123919 discloses a method in which a WFQ (weighted fair queuing) means for performing WFQ-type read control on non-priority-class traffic for each logical port and WRR (weighted round robin) means for performing WRR-type read control on traffic output from each WFQ means are provided. An SP (strict priority) type read control is performed on priority-class class output traffic from a priority queue and non-priority-class output traffic read under the WRR read control.

When the bandwidth controls are individually performed on the queues using the same physical line, there are cases in which, because of an insufficient amount of tokens accumulated for one queue, the packet transmission is not performed at timing at which packets can be transmitted. Consequently, the packet transmission is caused to wait until next transmission timing.

For example, at timing at which packets in one queue can be transmitted, when packet data of another queue is transmitted and this other queue occupies an entire transmission bandwidth of the physical line, no packet transmission from the queue is can be performed even when that queue is in the transmittable state. In particular, when the number of queues assigned to one physical line increases and a large number of bandwidth controls are individually performed on one physical line, the entire transmission bandwidth is used by the multiple queues to thereby increase the possibility of occurrence of an insufficient transmission bandwidth, which may cause any of the queues to wait for packet transmission multiple times.

In such a case, with respect to the queue caused to wait for the packet transmission, the amount of tokens accumulated increases, so that the amount of data burst-transferred during the packet transmission also increases. This causes a problem in that the amount of packet transmission fluctuation during the burst transfer (i.e., fluctuation in the amount of data burst-transferred during the packet transmission) increases.

SUMMARY

According to an aspect of the invention, a packet transmission device includes a buffer that has queues and that stores packet data in any of the queues, a queue manager that outputs queue-status signals, each indicating whether or not transmittable packet data exists in the corresponding one of the queues, a bandwidth controller that accumulates tokens for each queue at a certain period and that outputs token-status signals for the respective queues, each token-status signal indicating whether or not an amount of the tokens accumulated for the corresponding queue is larger than a token threshold provided for the corresponding queue, a queue selector that preferentially selects any queue whose duration time of a transmittable state in which the corresponding queue status signal indicates that transmittable packet data exists in the corresponding queue and the corresponding token-status signal indicates that the amount of the accumulated tokens is larger than the token threshold provided for the corresponding queue is greater than a duration-time threshold provided for the corresponding queue, and a buffer reader that controls reading of the packet data from the selected queue.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present disclosure will be described below.

Embodiments

1. First Embodiment

A description below will be given of a packet transmission device and a packet transmission method according to a first embodiment.

[1-1. Network in which Packets are Transmitted]

A network in which packets are transmitted will be described first.

Figure 1:
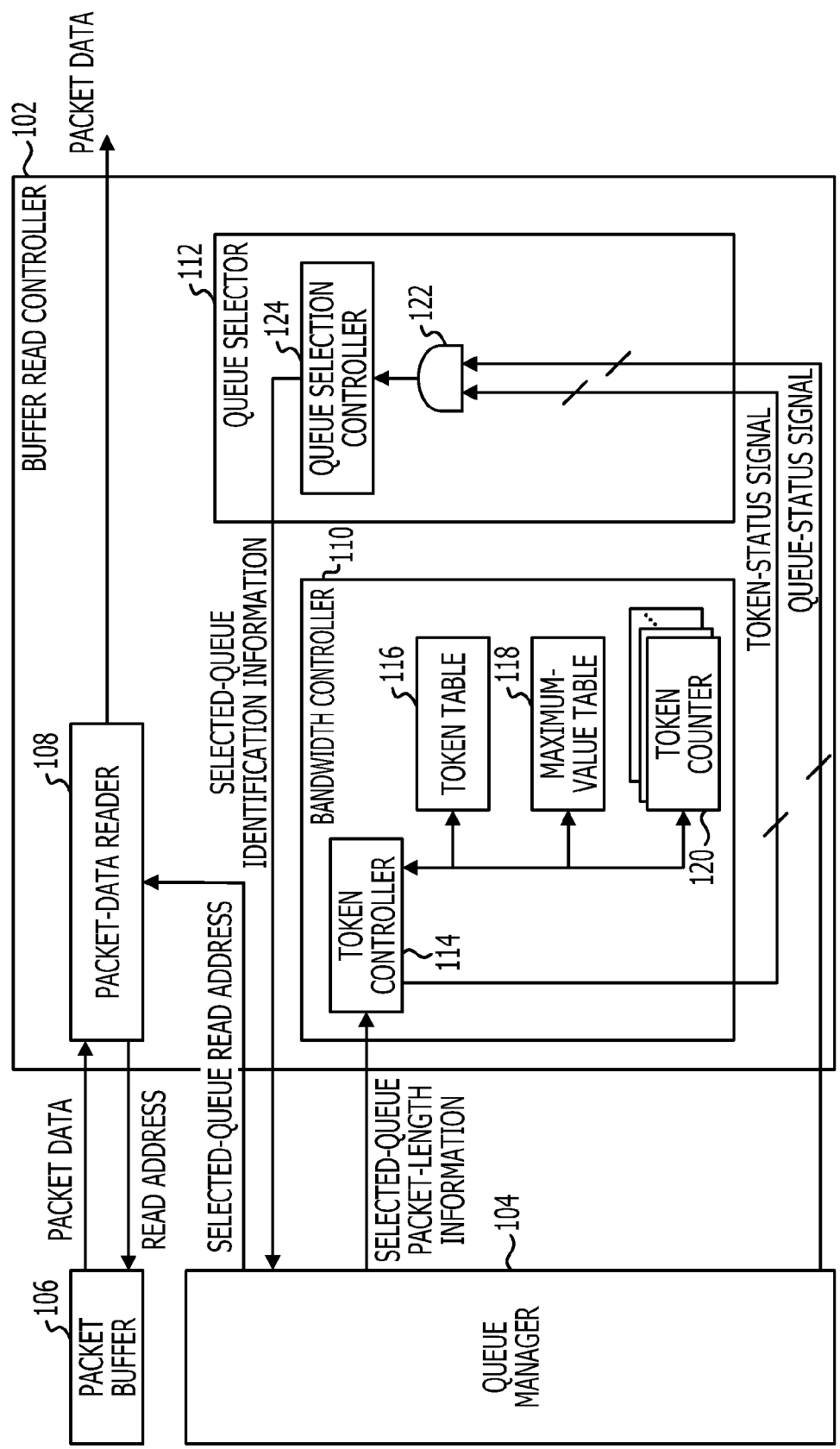
FIG. 1 is a block diagram illustrating one example of the internal configuration of a packet transmission device having a bandwidth control function.
Figure 2:
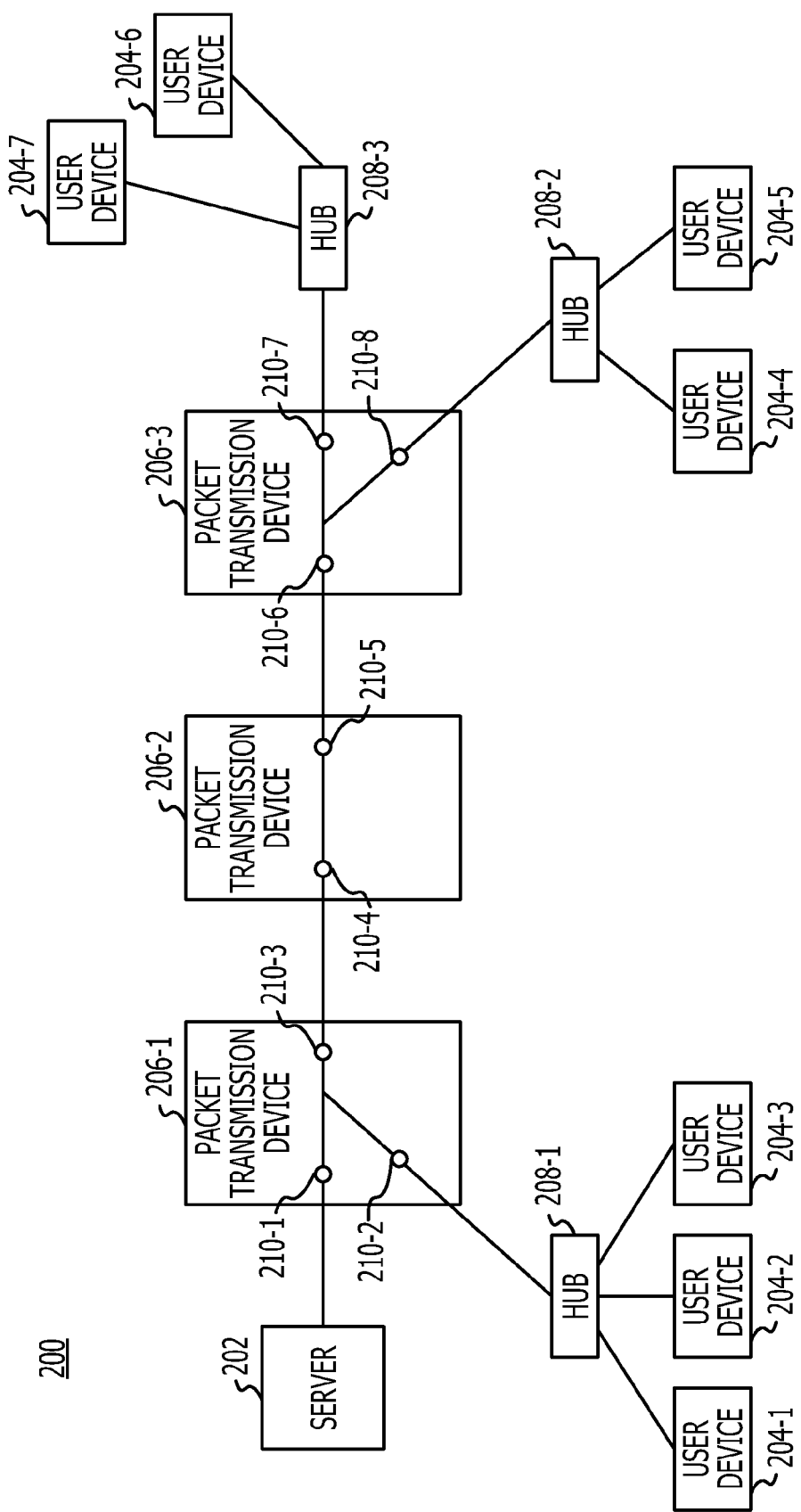
FIG. 2 is a block diagram illustrating one example of a network in which packets are transmitted.

FIG. 2 is a block diagram illustrating one example of a network in which packets are transmitted.

A network 200 illustrated in FIG. 2 includes a server 202, user devices 204-1 to 204-7 that serve as terminal nodes, and packet transmission devices 206-1 to 206-3 and hubs 208-1 to 208-3 that serve as relay nodes that provide connections between those terminal nodes. Each terminal node communicates with another terminal node via at least one of the relay nodes. The packet transmission devices 206-1 to 206-3 have bandwidth control functions, respectively. The packet transmission devices 206-1 to 206-3 have corresponding relay points 210-1 to 210-8, illustrated in FIG. 2, to perform bandwidth controls for respective traffic groups.

For example, communication between the user device 204-1 and the user device 204-5 is performed via the hub 208-1, the packet transmission devices 206-1 to 206-3, and the hub 208-2. Traffic of the communication between the user device 204-1 and the user device 204-5 is assumed to belong to a traffic group A. For example, communication between the user device 204-3 and the user device 204-6 is performed via the hub 208-1, the packet transmission devices 206-1 to 206-

3, and the hub 208-3. Traffic of the communication between the user device 204-3 and the user device 204-6 is assumed to belong to a traffic group B that is different from the traffic group A.

In the example described above, the traffic belonging to the traffic group A and the traffic belonging to the traffic group B merge together at the relay points 210-2 to 210-6. Thus, the packet transmission devices 206-1 to 206-3 perform the bandwidth controls at the corresponding relay points 210-2 to 210-6.

[1-2. Internal Configuration of Packet Transmission Device]

Next, a description will be given of the packet transmission devices used in the network 200 illustrated in FIG. 2.

Figure 3:
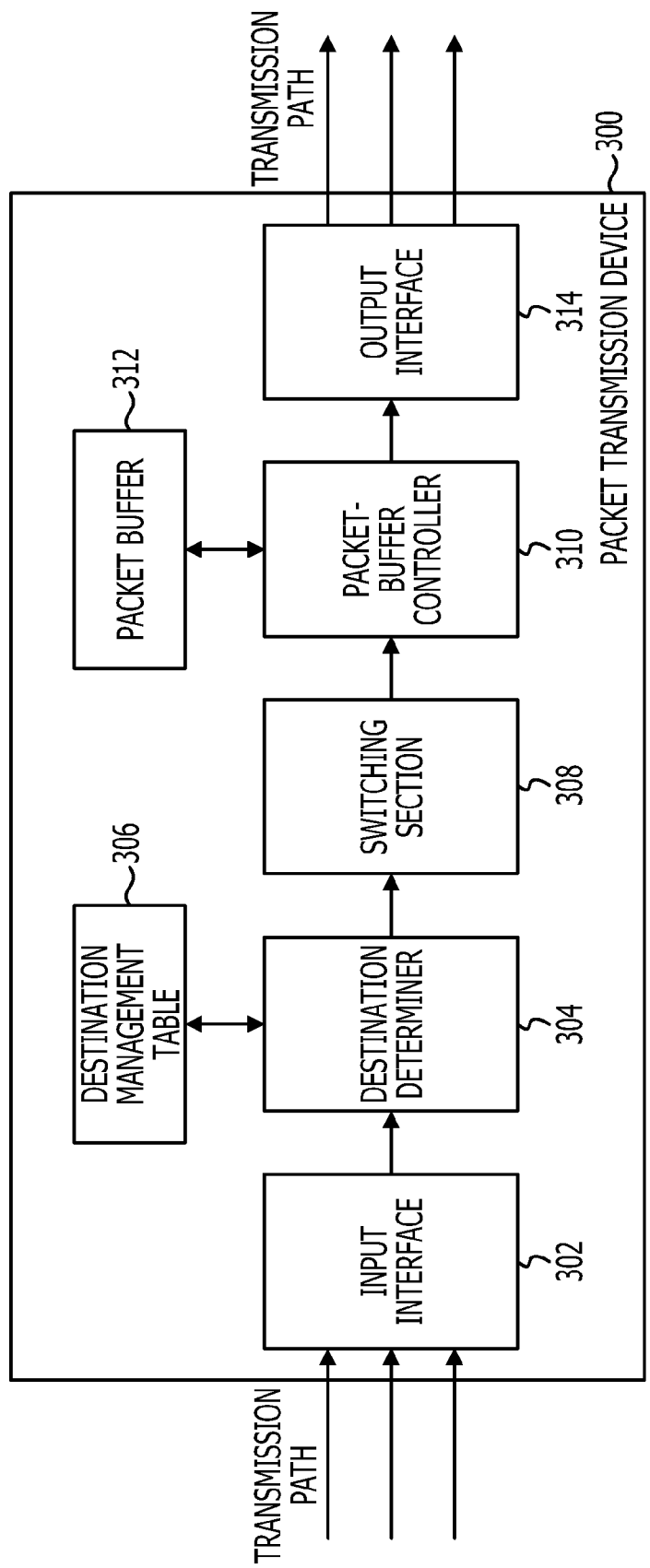
FIG. 3 is a block diagram illustrating one example of the internal configuration of a packet transmission device.

FIG. 3 is a block diagram illustrating one example of the internal configuration of a packet transmission device 300. The packet transmission device 300 corresponds to each of the packet transmission devices 206-1 to 206-3 in the network 200 illustrated in FIG. 2.

As illustrated in FIG. 3, the packet transmission device 300 includes an input interface 302, a destination determiner 304, a destination management table 306, a switching section 308, a packet-buffer controller 310, a packet buffer 312, and an output interface 314.

The input interface 302 receives packet data from external devices, such as another packet transmission device, a server, or a user device, via input ports (physical lines, not illustrated) of the packet transmission device 300.

The destination determiner 304 receives the packet data from the input interface 302. The destination determiner 304 refers to control data of the received packet to obtain destination information (e.g., a MAC (media access control) address) of the received packet. The destination management table 306 contains a management table indicating relationships between destination information, such as MAC addresses, and information regarding output paths (e.g., output ports) of the packet transmission device 300. The destination determiner 304 refers to the management table, contained in the destination management table 306, to determine the output port corresponding to the destination information of the received packet and generates output-path information containing information, such as the determined output port.

The switching section 308 receives the packet data, along with the output-path information for the packet data, from the destination determiner 304. On the basis of the received output-path information, the switching section 308 performs switching for the output port (physical line, not illustrated) for outputting the received packet data. The switching section 308 adds output-port information indicating the output port determined by the switching to the received packet data, to thereby generate packet data for transmission (which may hereinafter be referred to as "transmission packet data").

The packet-buffer controller 310 receives the transmission packet data from the switching section 308 and writes the received transmission packet data to the packet buffer 312. The packet buffer 312 has therein a data storage region, which is logically divided into multiple queues. In accordance with the traffic group to which the packet belongs, the packet buffer 312 temporarily stores the transmission packet data in any of the queues. The packet-buffer controller 310 assigns a corresponding one of the queues to each traffic group.

During reading of the transmission packet data from the packet buffer 312, the packet-buffer controller 310 executes bandwidth controls and priority controls for the queues from which data are to be output to the same output port (physical line). The bandwidth control is performed based on token control using tokens that are pieces of information for determining whether or not outputting of the packets is to be permitted. On the basis of the bandwidth control (token control), the packet-buffer controller 310 performs priority control for selecting, from the multiple queues, one queue from which the packet data is to be transmitted. The packet-buffer controller 310 reads the transmission packet data from the selected queue in the packet buffer 312, at timing determined by the priority control. Details of the bandwidth controls (the token controls) and the priority controls performed by the packet-buffer controller 310 are described below.

The output interface 314 receives, from the packet-buffer controller 310, the transmission packet data read from the packet buffer 312. The output interface 314 outputs the transmission packet data to the output port corresponding to the output port information added to the transmission packet data.

The elements of the packet transmission device 300 illustrated in FIG. 3 may be realized by, for example, digital-signal processing circuits or devices, such as an FPGA (field-programmable gate array) and an ASIC (application specific integrated circuit). The elements of the packet transmission device 300 may be realized by discrete circuits or devices or may be collectively realized by a single circuit or device. Alternatively, those elements may be realized by combining multiple circuits or devices that achieve the functions of the elements.

The destination management table 306 and the packet buffer 312 may also be realized by a memory that is independent from the other elements. One example of the memory is a RAM (random access memory).

[1-3. Internal Configuration of Packet-Buffer Controller 310]

The internal configuration of the packet-buffer controller 310 will be described next.

Figure 4:
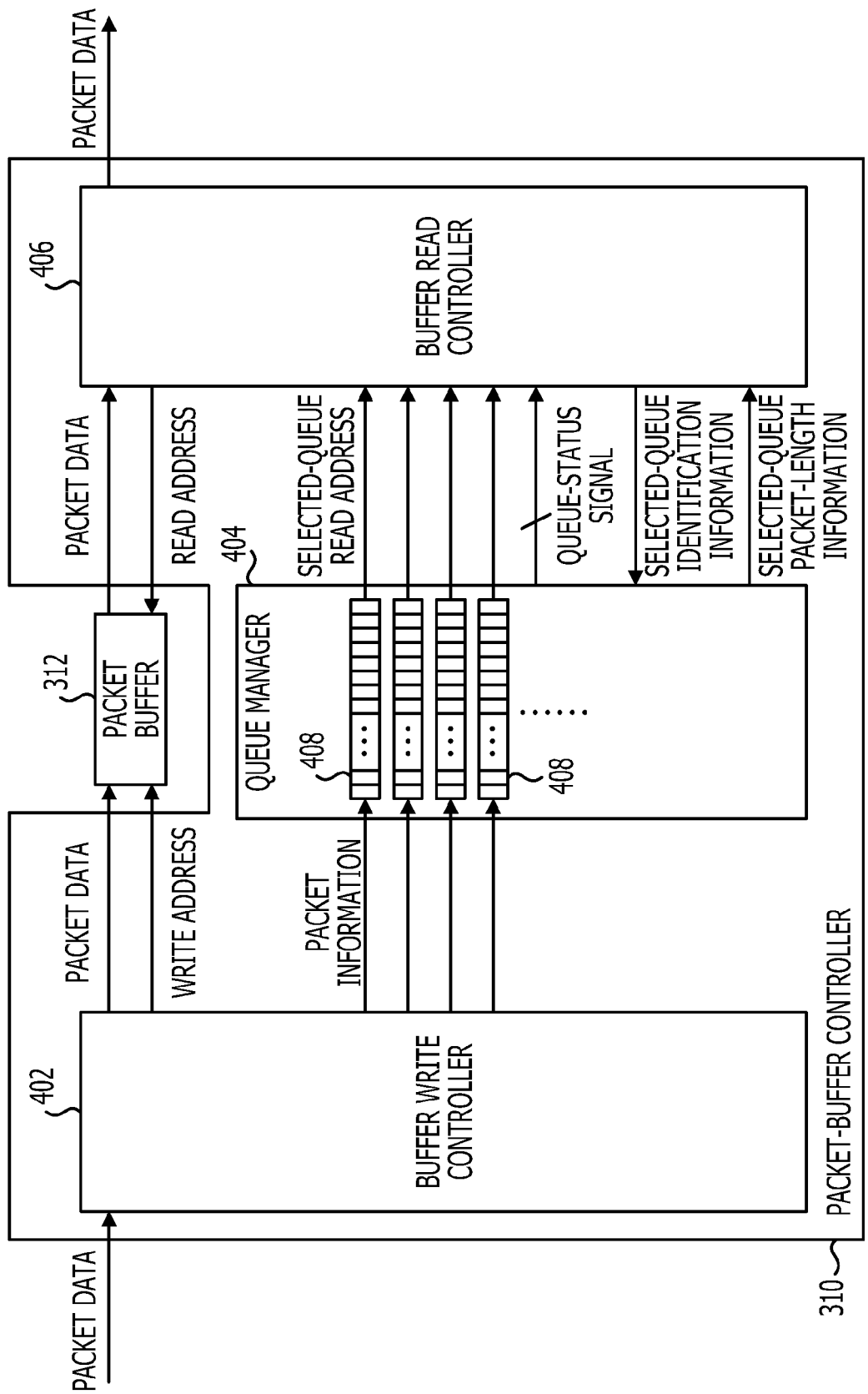
FIG. 4 is a block diagram illustrating one example of the internal configuration of a packet-buffer controller.

FIG. 4 is a block diagram illustrating one example of the internal configuration of the packet-buffer controller 310.

The packet-buffer controller 310 includes a buffer write controller 402, a queue manager 404, and a buffer read controller 406, as illustrated in FIG. 4, and has a function for executing bandwidth controls and priority controls for the multiple queues from which data are to be output to the same output port (physical line).

The buffer write controller 402 receives the transmission packet data from the switching section 308. The buffer write controller 402 specifies a write address at which the received packet data is to be stored and supplies the packet data and the write address to the packet buffer 312. The packet buffer 312 stores the supplied packet data in a data storage region indicated by the supplied write address.

The buffer write controller 402 also supplies packet information, including information such as the write address and a packet length of the stored packet data and control data therefor, to the queue manager 404.

The queue manager 404 receives the packet information from the buffer write controller 402. On the basis of the received packet information, the queue manager 404 identifies, of the queues from which data are to be output to the same output port (physical line), the queue assigned to the packet data stored in the packet buffer 312. The queue assignment is performed for each traffic group. More specifically, by referring to the control data of a received packet, the queue manager 404 performs the queue assignment according to the traffic group to which the received packet belongs. The packet-buffer controller 310 forms the traffic group by grouping multiple streams of traffic for transmission and reception in accordance with a destination device of a packet or the group to which a user that transmits the packet belongs.

The queue manager 404 includes multiple packet-information storage sections 408 associated with the multiple queues in the packet buffer 312. The packet-information storage sections 408 store management information for managing storage states of packet data in the corresponding queues. The queue manager 404 selects, from the packet-information storage sections 408, the packet-information storage section 408 associated with the identified queue. The queue manager 404 stores the received packet information in the selected packet-information storage section 408 in conjunction with identification information of the identified queue (i.e., "queue identification information").

On the basis of the packet information stored in the packet-information storage sections 408, the queue manager 404 determines whether or not transmittable packet data exists in each queue. On the basis of the result of the determination, the queue manager 404 generates queue-status signals for the respective queues. Each of the queue-status signals indicates whether or not transmittable packet data exists in the corresponding queue. When transmittable packet data exists in the corresponding queue, the queue-status signal is in an ON state (e.g., is at a high level), and when no transmittable packet data exists, the queue-status signal is in an OFF state (e.g., at a low level).

The buffer read controller 406 receives the queue-status signals from the queue manager 404. On the basis of the received queue-status signals, the buffer read controller 406 executes the bandwidth controls and the priority controls for the queues. The bandwidth control is performed based on token control using tokens that are pieces of information for determining whether or not outputting of the packets is to be permitted. On the basis of the bandwidth controls (token controls), the packet-buffer controller 406 performs priority control for preferentially selecting, from the multiple queues, one queue as a transmission source. Details of the bandwidth control (the token control) and the priority control performed by the buffer read controller 406 are described below. The buffer read controller 406 supplies the identification information of the queue selected by the priority control (i.e., the selected-queue identification information) to the queue manager 404.

The queue manager 404 receives the selected-queue identification information. On the basis of the received selected-queue identification information, the queue manager 404 identifies the packet-information storage section 408 having the corresponding queue identification information. By referring to the packet information stored in the identified packet-information storage section 408, the queue manager 404 generates a read address for the selected queue (this read address will hereinafter be referred to as a "selected-queue read address").

On the basis of the received selected-queue identification information, the queue manager 404 refers to the packet information, stored in the packet-information storage section 408, to generate information regarding a packet length of the packet data to be read from the selected queue (this information will hereinafter be referred to as "selected-queue packet-length information").

The buffer read controller 406 receives the selected-queue read address from the queue manager 404. On the basis of the received selected-queue read address, the buffer read controller 406 reads the transmission packet data from the selected queue in the packet buffer 312. The buffer read controller 406 supplies the read transmission packet data to the output interface 314. The buffer read controller 406 also receives the selected-queue packet-length information from the queue manager 404. On the basis of the received selected-queue packet-length information, the buffer read controller 406 continues the bandwidth control (the token control) and the priority control for each queue.

[1-4. Internal Configuration of Buffer Read Controller 406]

The internal configuration of the buffer read controller 406 will be described next.

Figure 5:
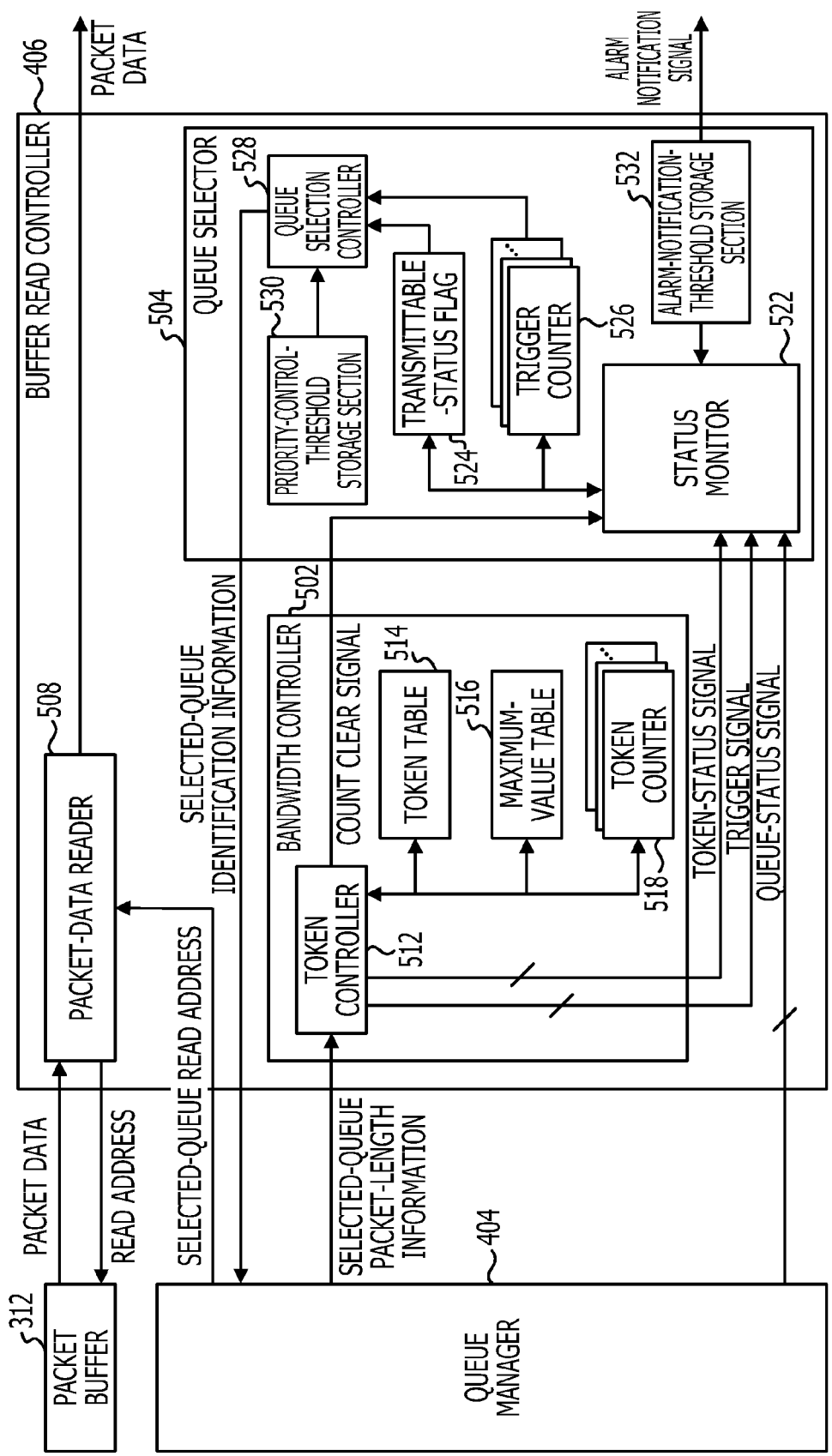
FIG. 5 is a block diagram illustrating one example of the internal configuration of a buffer read controller.

FIG. 5 is a block diagram illustrating one example of the internal configuration of the buffer read controller 406.

As illustrated in FIG. 5, the buffer read controller 406 includes a bandwidth controller 502, a queue selector 504, and a packet-data reader 508.

[1-4-1. Bandwidth Control]

Bandwidth control (token control) performed by the bandwidth controller 502 will be described first.

The bandwidth controller 502 includes a token controller 512, a token table 514, a maximum-value table 516, and token counters 518 (518-1 to 518-$n$, n represents the number of queues).

The token table 514 contains added-token values for the respective queues in the packet buffer 312. The added-token values are preset for the respective queues. Each added-token value indicates the amount of tokens periodically added according to a transmission bandwidth specified for the corresponding queue.

The maximum-value table 516 contains multiple maximum token values for the respective queues. The maximum token values are preset for the respective queues. Each maximum token value is a value of the corresponding token counter 518 and indicates the maximum amount of tokens that can be accumulated for the corresponding queue.

The token counters 518 (518-1 to 518-$n$) are provided so as to correspond to the respective queues. The token counters 518-1 to 518-$n$ perform count operations to accumulate added tokens and hold the resulting accumulated-token values for the corresponding queues, respectively. The count values of the token counters 518-1 to 518-$n$ indicate the current amounts of tokens accumulated for the corresponding queues.

The token controller 512 controls the count operations of the token counters 518-1 to 518-$n$. The token controller 512 refers to the added-token values stored in the token table 514 and supplies the added-token values to the corresponding token counters 518-1 to 518-$n$. The token controller 512 also supplies token-addition trigger signals to the corresponding token counters 518-1 to 518-$n$. Each token-addition trigger signal includes a trigger (a token addition trigger) indicating token-addition timing.

Each of the token counters 518-1 to 518-$n$ receives the corresponding token-addition trigger signal and adds, for each queue, the corresponding added-token value to the current count value (the accumulated-token value) at a predetermined period determined by the token addition trigger. In addition, the token controller 512 refers to the maximum token values stored in the maximum-value table 516. When the count value resulting for the addition for one queue exceeds the corresponding maximum token value, the token controller 512 sets the count value (the accumulated-token value) of the token counter 518, in place of the count value resulting from the addition, as the maximum token value.

The token controller 512 also generates token statuses for the corresponding queues and supplies the token status signals to the queue selector 504. Each of the token-status signals indicates whether or not a minimum amount of tokens or more is accumulated for the corresponding queue. The token controller 512 determines whether or not each of the count values (the accumulated-token values) of the token counters

518-1 to 518-*n* is larger than or equal to a predetermined token threshold (e.g., 0 (zero)). When the count value (the accumulated-token value) of the token counter 518 is larger than or equal to the token threshold, the token controller 512 puts the token-status signal for the corresponding queue into an ON state (e.g., a high level). On the other hand, upon determining that the count value (the accumulated-token value) of the token counter 518 is smaller than the token threshold, the token controller 512 puts the token-status signal for the corresponding queue into an OFF state (e.g., a low level). Although a case in which the common token threshold having a value of 0 (zero) is used for the multiple queues has been described in the present embodiment, token thresholds having different values may be set for the queues.

The token controller 512 further generates multiple trigger signals and supplies the trigger signals to the queue selector 504. The trigger signals have the same period as the period of the token-addition trigger signals supplied to the token counters 518-1 to 518-*n* and include triggers indicating timings at which tokens are added at the respective counters 518-1 to 518-*n*.

[1-4-2. Measurement of Duration Time of Transmittable State]

Next, a description will be given of measurement of duration time of a transmittable state for each queue, the measurement being performed by the queue selector 504.

The queue selector 504 includes a status monitor 522, a transmittable-status flag 524, trigger counters 526 (526-1 to 526-*n*), a queue selection controller 528, a priority-control-threshold storage section 530, and an alarm-notification-threshold storage section 532.

The status monitor 522 receives the token-status signals and the trigger signals from the token controller 512 in the bandwidth controller 502 and also receives the queue-status signals from the queue manager 404. The status monitor 522 monitors, for each queue, the state of the corresponding token-status signal and the status of the corresponding queue-status signal.

The transmittable-status flag 524 includes transmittable flags for the corresponding queues. Each transmittable flag indicates whether or not the corresponding queue is in a transmittable state. When the queue is in the transmittable state, the transmittable flag is put into an ON state, and when the queue is not in the transmittable state, the transmittable flag is put into an OFF state.

When the token-status signal for one queue indicates that a minimum amount of tokens or more is accumulated for the queue and the queue-status signal for the queue indicates that transmittable packet data exists in the queue, the status monitor 522 determines that the queue is in the transmittable state and puts the corresponding transmittable flag in the transmittable-status flag 524 into an ON state. That is, when both of the token-status signal and the queue-status signal for one queue indicate the ON states (e.g., high levels), the status monitor 522 determines that the queue is in the transmittable state and puts the corresponding transmittable flag in the transmittable-status flag 524 into the ON state.

On the other hand, when the token-status signal for one queue indicates that the amount of tokens stored in the queue is smaller than the minimum amount of tokens or when the queue-status signal for the queue indicates that no transmittable packet data exists in the queue, the status monitor 522 determines that the queue is not in the transmittable state and puts the corresponding transmittable flag in the transmittable-status flag 524 into the OFF state. That is, when at least one of the token-status signal and the queue-status signal for one queue indicates the OFF state (e.g., the low level), the status monitor 522 determines that the queue is not in the transmittable state and puts the corresponding transmittable flag in the transmittable-status flag 524 into the OFF state.

The status monitor 522 controls the count operations of the trigger counters 526-1 to 526-*n*. The trigger counters 526 (526-1 to 1326-*n*) are provided so as to correspond to the respective queues. Under the control of the status monitor 522, each of the trigger counters 526-1 to 526-*n* counts the number of triggers of the corresponding trigger signal, supplied to the status monitor 522, in a period in which the corresponding queue is in the transmittable state.

The trigger signal indicates timing at which the tokens are added with respect to the corresponding queue and the number of triggers of the trigger signal corresponds to the number of times the tokens are added (i.e., a token addition count). Thus, each of the count values of the trigger counters 526-1 to 526-*n* corresponds to the number of times the tokens are added when the corresponding queue is in the transmittable state.

Since the period of the trigger signal does not change (and is the same as the period of the token-addition trigger signals supplied to the token counters 518-1 to 518-*n*), the count values of the trigger counters 526-1 to 526-*n* also indicate the duration times of the transmittable states of the corresponding queues. Thus, through the above-described count operations of the trigger counters 526-1 to 526-*n*, the status monitor 522 can measure the duration times of the transmittable states for the respective queues.

The status monitor 522 controls the count operations of the trigger counters 526-1 to 526-*n*, as described below.

When the transmittable flag in the transmittable-status flag 524 for any of the queues changes from the OFF state to the ON state, the corresponding one of the trigger counters 526-1 to 526-*n* starts the count operation for counting the number of triggers of the corresponding trigger signal and continuously counts the number of triggers of the trigger signal while the corresponding transmittable flag indicates the ON state.

When the transmittable flag changes from the ON state to the OFF state, the corresponding one of the trigger counters 526-1 to 526-*n* stops the count operation and clears the count value (i.e., sets the count value to 0 (zero)). Also, in response to a count clear signal (described below), each of the trigger counters 526-1 to 526-*n* clears the count value (i.e., sets the count value to 0 (zero)).

[1-4-3. Priority Control for Queue Selection]

Next, a description will be given of priority control for queue selection, the priority control being performed by the queue selector 504.

In response to a packet transmission trigger, the queue selection controller 528 refers to the states of the transmittable flags in the transmittable-status flag 524 and the states of the count values of the trigger counters 526 (i.e., the token addition counts) to monitor the duration times of the transmittable states for the respective queues and performs priority control for preferentially selecting, from the multiple queues, any queue whose duration time of the transmittable state is greater than a predetermined threshold (i.e., a duration-time threshold) as a transmission source.

The packet transmission trigger is a trigger signal generated at timing when the output port (physical line) to which the data is to be output is available for transmission, the timing being determined by the transmission bandwidth of the output port (physical line). The packet transmission trigger is generated when a bandwidth control function (not illustrated), provided in the packet-buffer controller 310, for the output port (physical line) determines that the output port (physical line) has a certain amount of available transmission bandwidth. Alternatively, the packet transmission trigger may be generated by the output interface 314 when any of the amounts of data in cache buffers (not illustrated), provided in the output interface 314, for the respective output ports (physical lines) is smaller than or equal to a certain amount.

The queue selector 504 performs the priority control as described below.

The priority-control-threshold storage section 530 stores a priority control threshold that is used as a reference for the above-described priority control. The priority control threshold is a threshold for the count values of the trigger counters 526 (i.e., the token addition counts) and corresponds to the threshold for the duration time of the transmittable state (i.e., the duration-time threshold). The priority control threshold may be a value individually set for each queue or may be a common value set for the queues.

The queue selection controller 528 refers to the priority-control-threshold storage section 530 to obtain the priority control threshold. The queue selection controller 528 monitors, for each queue, the state of the corresponding transmittable flag and the count value of the corresponding trigger counter 526 (i.e., the token addition count). The queue selection controller 528 preferentially selects, from the multiple queues, any queue whose transmittable flag indicates the ON state and whose count value of the trigger counter 526 is larger than the obtained priority control threshold as a transmission source.

The queue selection controller 528 generates identification information of the queue selected based on the priority control (i.e., the selected-queue identification information) and supplies the selected-queue identification information to the queue manager 404.

When two or more queues are selected as transmission sources on the basis of the priority control, the queue selection controller 528 sequentially selects the transmission-source queues one by one from the selected two or more queues on the above-described Round Robin (RR) basis and sequentially generates corresponding selected-queue identification information.

When no queue is selected as a transmission source on the basis of the priority control, the queue selection controller 528 sequentially selects the transmission-source queues one by one from all queues from which data are to be output to the same output port (physical line), on the Round Robin (RR) basis, and sequentially generates corresponding selected-queue identification information.

There are cases in which a transmission bandwidth is not sufficient, for example, a case in which the entire transmission bandwidth of one output port (physical line) to which data are to be output from the queues is used. In such a case, in the above-described priority control, even when the queue that can be selected as a transmission source exists, the queue selection controller 528 does not select the queue and delays the selection thereof until a bandwidth becomes available.

The queue manager 404 receives the selected-queue identification information from the queue selection controller 528. As described above, on the basis of the received selected-queue identification information, the queue manager 404 generates a read address for the selected queue (i.e., a selected-queue read address) and information of a packet length of packet data to be read from the selected queue (i.e., selected-queue packet-length information).

The packet-data reader 508 receives the selected-queue read address from the queue manager 404. On the basis of the received selected-queue read address, the packet-data reader 508 supplies the read address to the packet buffer 312.

The packet buffer 312 receives the read address from the packet-data reader 508, reads packet data from the data storage region indicated by the received read address, and outputs the packet data.

The packet-data reader 508 then receives the packet data from the packet buffer 312 and supplies the received packet data to the output interface 314.

The token controller 512 in the bandwidth controller 502 receives the selected-queue packet-length information from the queue manager 404. On the basis of the received selected-queue packet-length information, the token controller 512 determines a token value corresponding to the packet length of the packet data read from the packet buffer 312. The token controller 512 subtracts the determined token value from the current count value (the accumulated-token value) of the token counter 518 for the selected queue, to thereby update the count value (the accumulated-token value) of the token counter 518 for the selected queue. On the basis of the updated count value (the accumulated-token value), the bandwidth controller 502 continuously performs the bandwidth control (token control) for each queue.

In addition, the token controller 512 generates a count clear signal for the selected queue and supplies the count clear signal to the status monitor 522 in the queue selector 504. The count clear signal is a signal for instructing the status monitor 522 so as to clear the count value of the trigger counter 526 for the selected queue.

Upon receiving the count clear signal, the status monitor 522 in the queue selector 504 clears the count value of the corresponding trigger counter 526 (i.e., sets the count value to 0 (zero)).

As described above, the queue selector 504 in the buffer read controller 406 according to the first embodiment monitors the duration times of the transmittable states for the respective queues and performs priority control for preferentially selecting, from the multiple queues, the queue whose duration time is greater than the predetermined threshold as the transmission source. Thus, under the situation in which a shortage in the transmission bandwidth of the corresponding output port (the physical line) causes any of the queues to wait for packet transmission even when it is in the transmittable state, the buffer read controller 504 can preferentially selects the queue whose duration time of the transmittable state is greater.

Hence, it is possible to inhibit an increase in the amount of data burst-transferred during packet transmission, the burst transfer resulting from an increase in the amount of tokens accumulated for each queue (i.e., an increase in the accumulated-token value), and it is also possible to inhibit an increase in packet-transmission fluctuations during the burst transfer.

[1-4-4. Alarm Notification Processing]

Next, a description will be given of alarm notification processing performed by the queue selector 504.

The status monitor 522 refers to the alarm-notification-threshold storage section 532 to obtain an alarm notification threshold stored therein. The alarm notification threshold stored in the alarm-notification-threshold storage section 532 is a threshold corresponding to the count value of the trigger counter 526 and also corresponding to the threshold for duration time of the transmittable state.

The status monitor 522 monitors the count values of the trigger counters 526. Upon determining that any of the count values of the trigger counters 526 is larger than the alarm notification threshold, the status monitor 522 outputs an alarm notification signal. The alarm notification signal may include the identification information of the queue whose count value of the trigger counter 526 exceeds the alarm notification threshold or information such as the time of occurrence of the event.

The alarm notification signal is output to a control device (not illustrated) for comprehensively controlling various circuits, devices, or the like, including those illustrated in FIG. 3, in the packet transmission device 300. The control device receives the alarm notification signal and stores the reception state of the alarm notification signal, for example, in the form of a log.

As described above, the buffer read controller 406 in the first embodiment is adapted such that the status monitor 522 outputs the alarm notification signal. Accordingly, for example, by referring to the aforementioned log, a network administrator can appropriately recognize the states of the bandwidth controls (token controls) performed by the packet transmission device 300 and can obtain statistical information indicating, for example, in which of the queues the duration time of the transmittable state is more likely to exceed the threshold.

With this arrangement, the network administrator can appropriately set various transmission parameters, such as the transmission bandwidth for each queue, the amount of tokens periodically added for each queue, and the maximum value of the amount of tokens accumulated and also can appropriately design the network.

[1-5. Packet Transmission Control of Packet Buffer Controller 310]

Next, a description will be given of packet transmission control processing executed by the packet buffer controller 310 in the packet transmission device 300.

[1-5-1. Processing Executed Upon Generation of Token Addition Trigger]

Figure 6:
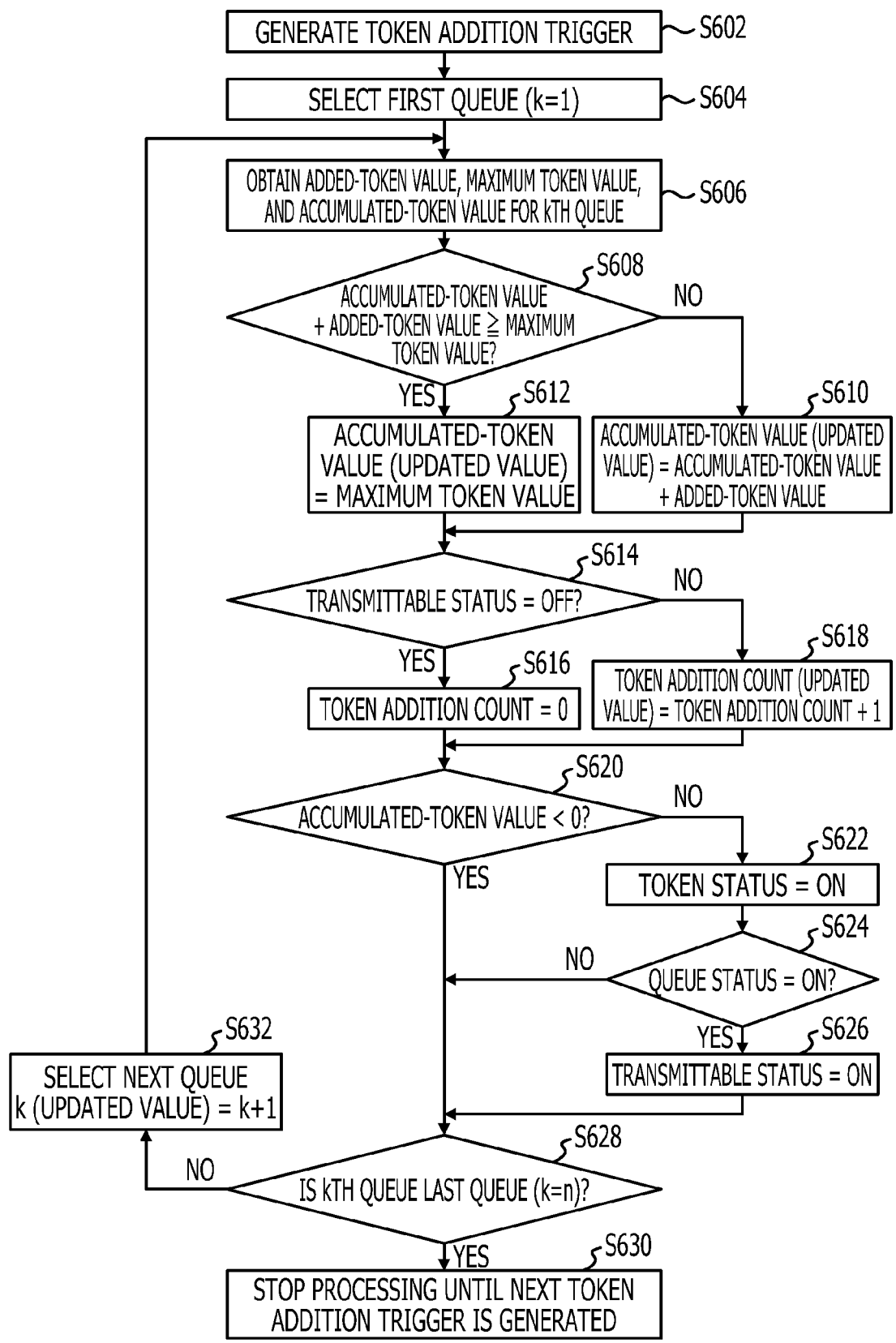
FIG. 6 is a flowchart illustrating details of packet-transmission control processing that the packet buffer controller executes upon generation of a token addition trigger.

FIG. 6 is a flowchart illustrating details of packet-transmission control processing executed upon generation of a token addition trigger.

In operation S602, the token controller 512 in the bandwidth controller 502 generates a trigger (a token addition trigger) indicating token-addition timing and outputs the token addition trigger to the token counter 518 as a token-addition trigger signal.

In operation S604, the token controller 512 selects, from the queues from which data are to be output to the same output port (physical line), the first queue as a queue to be processed.

In operation S606, the token controller 512 obtains the added-token value, the maximum token value, and the accumulated-token value for the kth queue. More specifically, the token controller 512 obtains the added-token value for the kth queue by referring to the token table 514, obtains the maximum token value for the kth queue by referring to the maximum-value table 516, and also obtains the accumulated-token value by reading the count value from the token counter 518 for the kth queue.

In operation S608, in the token controller 512, the token counter 518 for the kth queue adds the accumulated-token value and the added-token value obtained in operation S606 and determines whether or not the token value resulting from the addition is larger than or equal to the maximum token value obtained in operation S606. When the result of the determination indicates that the token value resulting from the addition is smaller than the maximum token value, the process proceeds to operation S610. When the token value resulting from the addition is larger than or equal to the maximum token value, the process proceeds to operation S612.

In operation S610, the token controller 512 holds the token value resulting from the addition as the count value of the token counter 518 for the kth queue and uses the token value resulting from the addition as an updated value of the accumulated-token value. The token controller 512 generates a trigger corresponding to the token addition trigger generated in operation S602 and outputs the trigger to the status monitor 522 in the queue selector 504 as a trigger signal for the kth queue.

In operation S612, the token controller 512 sets the count value of the token counter 518 for the kth queue, instead of the token value resulting from the addition, to the maximum token value obtained in operation S606, to thereby use the maximum token value as an updated value of the accumulated-token value. The token controller 512 also outputs the trigger signal to the status monitor 522, as in the case in operation S610.

In operation S614, the status monitor 522 receives, from the token controller 512, the trigger signal for the kth queue. In response to the trigger included in the received trigger signal, the status monitor 522 checks the state of, in the transmittable-status flag 524, the transmittable flag for the kth queue. When the result of the checking indicates that the transmittable flag is in the OFF state, the process proceeds to operation S616. When the transmittable flag is in the ON state, the process proceeds to operation S618.

In operation S616, the status monitor 522 causes the trigger counter 526 for the kth queue to stop the count operation for counting the number of triggers of the trigger signal supplied from the token controller 512 and to clear the count value (i.e., the token addition count), i.e., to set the count value to 0 (zero). As a result, the status monitor 522 resets the value of the token addition count for the kth queue and holds the value at 0 (zero).

In operation S618, the status monitor 522 causes the trigger counter 526 for the kth queue to execute the count operation for counting the number of triggers of the trigger signal supplied from the token controller 512. The trigger counter 526 detects, from the trigger signal, a trigger corresponding to the token addition trigger and increments the count value (i.e., the token addition count) by 1. As a result, the status monitor 522 increments the value of the token addition count for the kth queue by 1 to update the value of the token addition count.

In operation S620, the token controller 512 refers to the count value (the accumulated-token value) of the token counter 518 for the kth queue to thereby determine whether or not the accumulated-token value is smaller than 0 (zero) i.e., is a negative value. When the result of the determination indicates that the accumulated-token value is larger than or equal to 0 (zero), the process proceeds to operation S622. When the accumulated-token value is a negative value, the process proceeds to operation S628.

In operation S622, the token controller 512 determines that the minimum amount of tokens or more is accumulated for the kth queue and sets the token-status signal for the kth queue to an ON state (e.g., a high level).

In operation S624, the status monitor 522 checks the state of the queue-status signal for the kth queue. When the result of the checking indicates that the queue-status signal is in the ON state, the process proceeds to operation S626. When the queue-status signal is in the OFF state, the process proceeds to operation S628.

In operation S626, the status monitor 522 determines that transmittable packet data exists in the kth queue and sets, in the transmittable-status flag 524, the transmittable flag for the kth queue to the ON state.

In operation S628, the token controller 512 determines whether or not the kth queue that is currently processed is the last queue (k=n, n represents the number of queues). When the result of the determination indicates that the kth queue is the last queue, the process proceeds to operation S630. When the kth queue is not the last queue, the process proceeds to operation S632.

In operation S630, the packet-buffer controller 310 ends the series of processing. The token controller 512 stops the processing until a next token addition trigger is generated.

In operation S632, the token controller 512 selects the next queue, i.e., the (k+1)th queue, as a queue to be processed, to thereby update the queue to be processed. Subsequently, the process returns to operation S606 and the packet-buffer controller 310 executes the processing in operations S606 to S628 on the updated queue to be processed.

In the above-described series of processing in operations S602 to S632, upon generation of the token addition trigger, the packet-buffer controller 310 can appropriately set, for each queue, the state of the token-status signal and the state of the transmittable status flag in accordance with the amount of tokens accumulated for the queue (i.e., the accumulated-token value). In addition, when the transmittable flag in the transmittable-status flag 524 is in the ON state, the packet-buffer controller 310 can appropriately measure the duration time of the transmittable state of the corresponding queue by counting the token addition count for the queue.

[1-5-2. Processing Executed Upon Reception of Packet]

Figure 7:
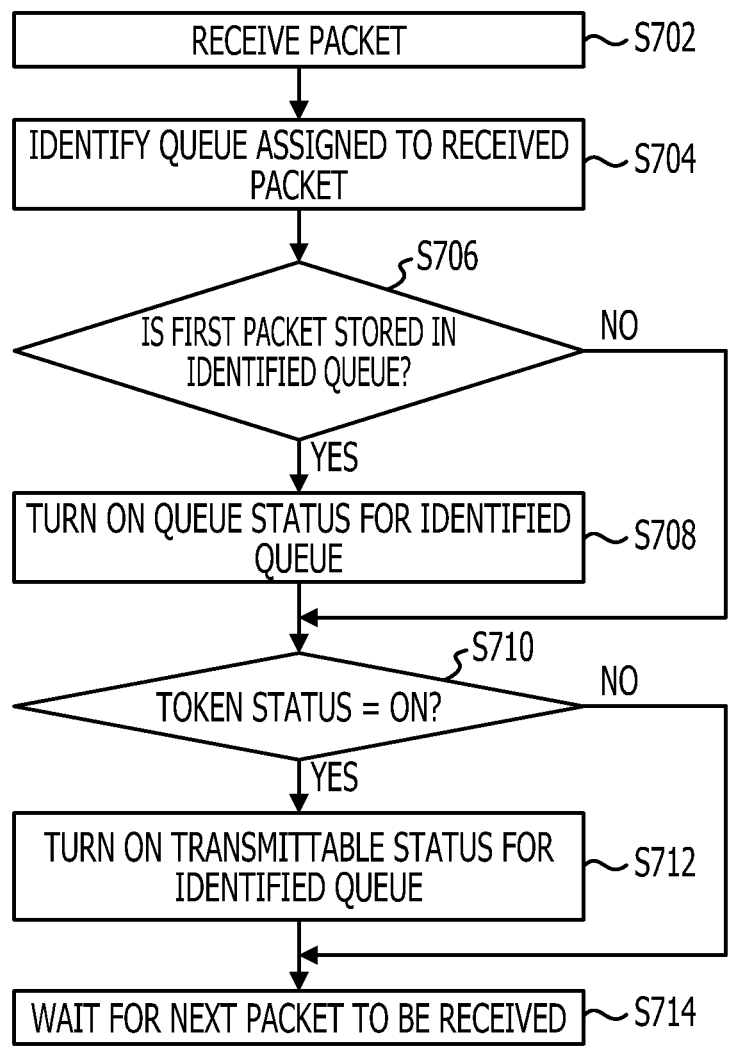
FIG. 7 is a flowchart illustrating details of packet-transmission control processing that the packet buffer controller executes upon reception of a packet.

FIG. 7 is a flowchart illustrating details of packet-transmission control processing executed upon reception of a packet.

In operation S702, the buffer write controller 402 receives packet data for transmission. The buffer write controller 402 writes the received transmission packet data to the packet buffer 312.

In operation S704, the queue manager 404 receives, from the buffer write controller 402, packet information regarding the written packet data. On the basis of the received packet information, the queue manager 404 identifies, of the queues from which data are to be output to the same output port (physical line), the queue assigned to the packet data stored in the packet buffer 312.

In operation S706, the queue manager 404 determines whether or not the received packet is a first packet to be stored in the queue identified in operation S704. When the result of the determination indicates that the received packet is a first packet to be stored in the identified queue, the process proceeds to operation S708. When the received packet is not a first packet to be stored in the identified queue, the process proceeds to operation S710.

In operation S708, the queue manager 404 confirms that transmittable packet data is stored in the queue identified in operation S704, sets the queue-status signal for the identified queue to the ON state (e.g., the high level), and outputs the ON-state queue-status signal to the status monitor 522 in the queue selector 504.

In operation S710, the status monitor 522 receives, from the queue manager 404, the queue-status signal for the queue identified in operation S704. In response to the ON state of the received queue-status signal, the status monitor 522 checks the state of the token-status signal for the queue identified in operation S704. When the result of the checking indicates that the queue-status signal is in the ON state, the process proceeds to operation S712. When the queue-status signal is in the OFF state, the process proceeds to operation S714.

In operation S712, the status monitor 522 determines that a minimum amount of tokens or more is accumulated for the identified queue, and sets, in the transmittable-status flag 524, the transmittable flag for the identified queue to the ON state.

In operation S714, the packet-buffer controller 310 ends the series or processing and waits for a next packet to be received.

In the above-described series of processing in operations S702 to S714, upon reception of a packet, the packet-buffer controller 310 can appropriately set the state of the queue-status signal and the state of the transmittable status flag for each queue.

[1-5-3. Processing Executed in Response to Packet Transmission Trigger]

Figure 8:
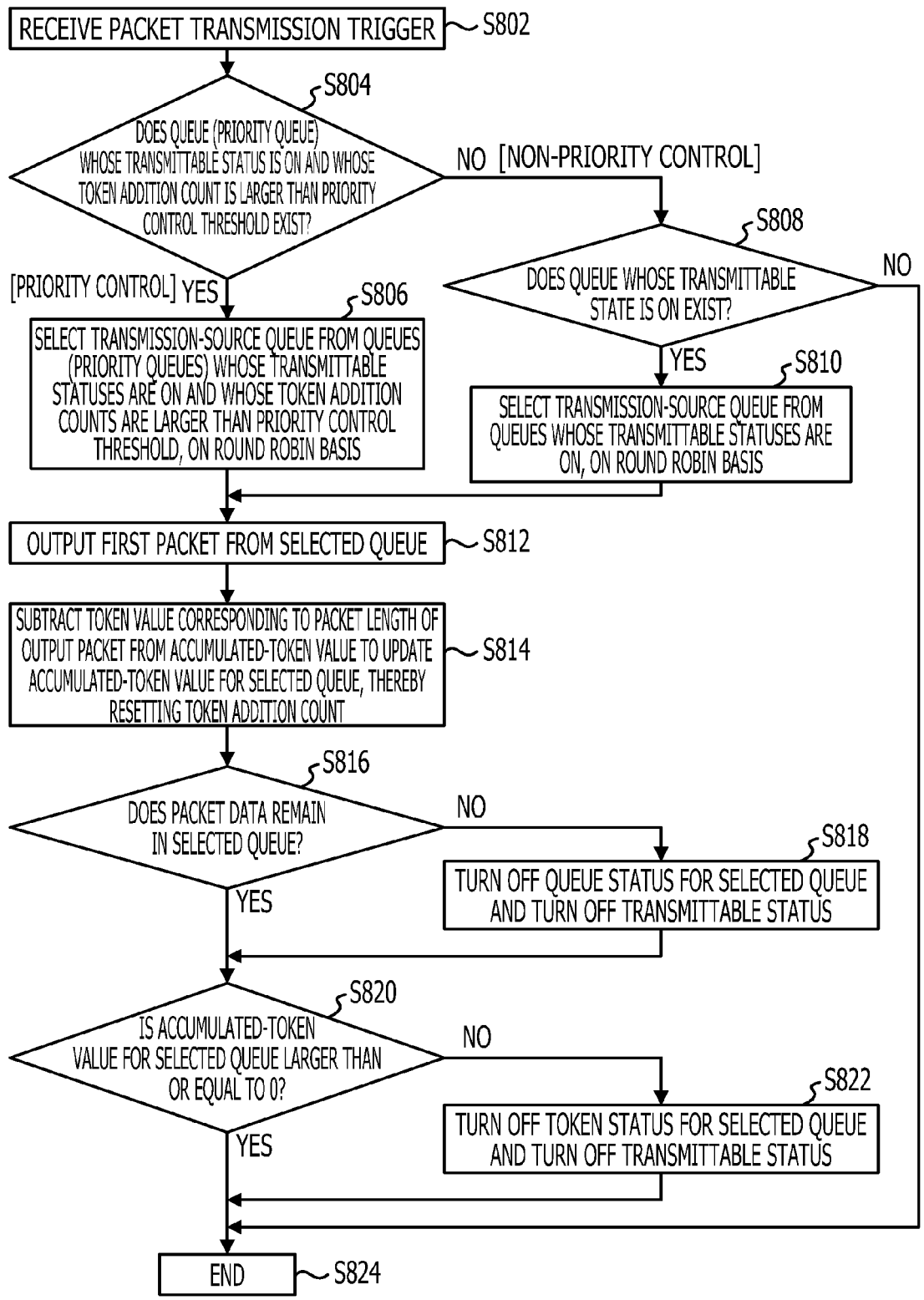
FIG. 8 is a flowchart illustrating details of packet-transmission control processing that the packet buffer controller executes in response to a packet transmission trigger.

FIG. 8 is a flowchart illustrating details of packet-transmission control processing executed in response to a packet transmission trigger.

In operation S802, the queue selection controller 528 in the queue selector 504 receives a packet transmission trigger. As described above, the packet transmission trigger is a trigger signal generated at timing when the output port (physical line) to which data are to be output is available for transmission, the timing being determined by the transmission bandwidth of the output port (physical line).

In operation S804, the queue selection controller 528 refers to the priority-control-threshold storage section 530 to obtain a priority control threshold and also checks the state of the transmittable-status flag 524 and the count values of the trigger counters 526. The queue selection controller 528 determines whether or not any queue whose transmittable flag in the transmittable-status flag 524 is in the ON state and whose token addition count is larger than the priority control threshold (the queue is hereinafter referred to as a "priority queue") exists in the multiple queues. When the result of the determination indicates that any priority queue exists, the process proceeds to operation S806. When no priority queue exists, the process proceeds to operation S808.

In operation S806, when the number of priority queues in the multiple queues is two or more, the queue selection controller 528 selects one of the priority queues as a transmission source on the Round Robin basis. When only one priority queue exists, the queue selection controller 528 selects the priority queue as a transmission source. The queue selection controller 528 notifies the queue manager 404 about the identification information of the selected queue (i.e., the selected-queue identification information).

In operation S808, the queue selection controller 528 determines whether or not any queue whose transmittable flag in the transmittable-status flag 524 is in the ON state exists in the multiple queues. When the result of the determination indicates that any queue whose transmittable flag is in the ON state exists, the process proceeds to operation S810. When the result of the determination indicates that any queue whose transmittable flag is in the ON state does not exist, the process proceeds to operation S824.

In operation S810, when the number of queues whose transmittable flags are in the ON states is two or more, the queue selection controller 528 selects one of the queues as a transmission source on the Round Robin basis. When the number of queues whose transmittable flags are in the ON states is only one, the queue selection controller 528 selects the queue as a transmission source. The queue selection controller 528 notifies the queue manager 404 about the identification information of the selected queue (i.e., the selected-queue identification information).

In operation S812, on the basis of the selected-queue identification information, the queue manager 404 refers to the packet-information storage section 408 for the queue selected in operation S806 or S810, to generate a read address of the first packet data stored in the selected queue. The packet-data reader 508 reads the first packet data from the data storage region included in the packet buffer 312 and indicated by the generated read address and outputs the read first packet data to the output interface 314.

In operation S814, the token controller 512 in the bandwidth controller 502 receives the information of the packet length of the packet data read from the selected queue (i.e., receives the selected-queue packet-length information) from the queue manager 404 and determines a token value corresponding to the packet length. The token controller 512 subtracts the determined token value from the current count value (the accumulated-token value) of the token counter 518 for the selected queue, to thereby update the accumulated-token value for the selected queue.

The token controller 512 further issues, to the status monitor 522, a request for clearing the count value of the trigger counter 526 for the selected queue. In response to the clearing request, the status monitor 522 clears the count value of the trigger counter 526 (i.e., the token addition count) for the selected queue (i.e., sets the count value to 0 (zero)), to thereby reset the token addition count.

In operation S816, the queue manager 404 determines whether or not packet data remains in the selected queue in the packet buffer 312 after the packet-data outputting performed in operation S812. When the result of the determination indicates that no packet data remains, the process proceeds to operation S818. When packet data remains, the process proceeds to operation S820.

In operation S818, the queue manager 404 confirms that no packet data remains in the selected queue and sets the queue-status signal for the selected queue to an OFF state (e.g., a low level). Upon the change of the queue-status signal to the OFF state, the status monitor 522 sets, in the transmittable-status flag 524, the transmittable flag for the selected queue to the OFF state.

In operation S820, the token controller 512 refers to the count value (the accumulated-token value) of the token counter 518 for the selected queue after the update performed in operation S814, to thereby determine whether or not the accumulated-token value for the selected queue after the packet-data outputting performed in operation S812 is larger than or equal to a threshold (e.g., 0 (zero)). When the result of the determination indicates that the accumulated-token value for the selected queue is larger than or equal to the threshold, the process proceeds to operation S824. When the accumulated-token value for the selected queue is smaller than the threshold, the process proceeds to operation S822.

In operation S822, the token controller 512 determines that the minimum amount of tokens or more does not remain in the selected queue and sets the token-status signal for the selected queue to an OFF state (e.g., a low level). Upon the change of the token-status signal to the OFF state, the status monitor 522 sets, in the transmittable-status flag 524, the transmittable flag for the selected queue to the OFF state.

In operation S824, the packet-buffer controller 310 ends the series of processing.

In the above-described series of processing in operations S802 to S824, during selection of the transmission-source queue upon reception of the packet transmission trigger, the packet-buffer controller 310 can determine whether or not the priority control is to be performed, in accordance with the token addition count for each queue. Thus, with respect to each queue, it is possible to appropriately perform the priority control according to the duration time of the transmittable state of the queue.

With this arrangement, under the situation in which an insufficient transmission bandwidth of the corresponding output port (physical line) causes any of the queues to wait for packet transmission even when the queue is in the transmittable state, the queue whose duration time of the transmittable state is greater can also be preferentially selected as a transmission source. Hence, it is possible to inhibit an increase in the amount of data burst-transferred during packet transmission, the burst transfer resulting from an increase in the amount of tokens accumulated for each queue (i.e., an increase in the accumulated-token value), and it is also possible to inhibit an increase in packet-transmission fluctuations during the burst transfer.

In addition, even after the packet data is output from the selected queue, the packet-buffer controller 310 can appropriately set the state of the transmittable status flag for each queue.

[1-5-4. Modification of Packet-Buffer Controller]

The packet transmission control processing illustrated in FIGS. 6 to 8 may also be realized with software, instead of the hardware illustrated in FIGS. 4 and 5, by causing a program to execute the various types of processing illustrated in FIGS. 6 to 8.

In such a case, the packet-buffer controller 310 may include, for example, a program memory for storing a program (a packet buffer control program) that implements the processing in the operations illustrated in FIGS. 6 to 8, a processor that can execute the program, and a work memory that provides a work area for computation processing performed by the processor.

By using the work memory to execute the packet buffer control program stored in the program memory, the processor in the packet-buffer controller 310 can execute processing that is equivalent to the processing executed by cooperation of the elements in the packet-buffer controller 310 illustrated in FIGS. 4 and 5.

2. Second Embodiment

A description below will be given of a packet transmission device and a packet transmission method according to a second embodiment.

[2-1. Internal Configuration of Buffer Read Controller 906]

The configuration of a packet transmission device 900 according to a second embodiment is similar to the configuration of the packet transmission device 300 illustrated in FIGS. 3 to 5, except for the internal configuration of the buffer read controller included in the packet buffer controller. Hence, the overall configuration of the packet transmission device 900 according to the second embodiment is neither described nor illustrated, and a description will be given of the internal configuration of a buffer read controller 906 in a packet buffer controller 910 (not illustrated) in the second embodiment.

Figure 9:
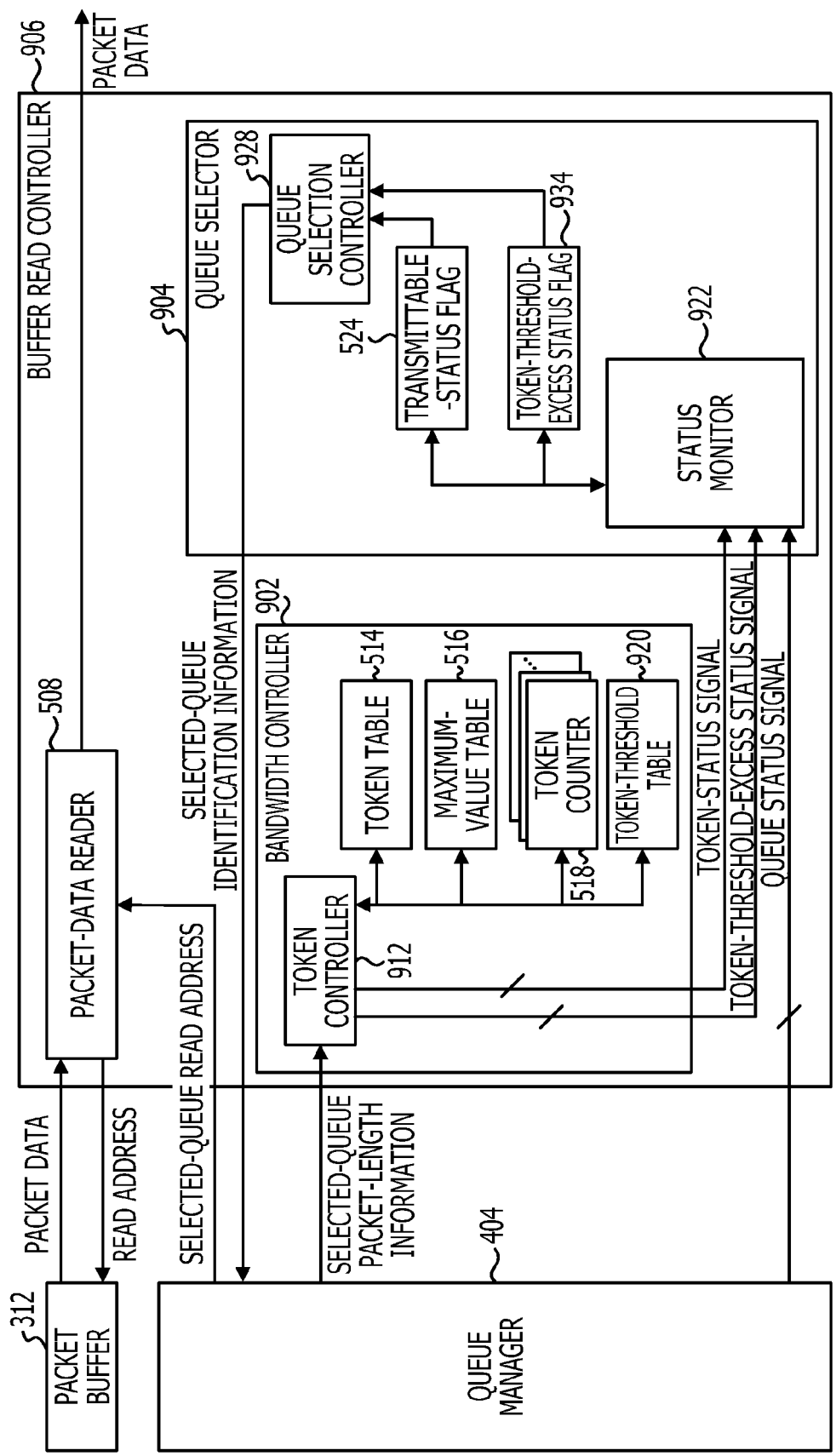
FIG. 9 is a block diagram illustrating one example of the internal configuration of a buffer read controller in a second embodiment.

FIG. 9 is a block diagram illustrating one example of the internal configuration of the buffer read controller 906 in the second embodiment. The configuration of the buffer read controller 906 is similar to the configuration of the buffer read controller 406 illustrated in FIG. 5, except for the internal configurations of the bandwidth controller and the queue selector.

A bandwidth controller 902 illustrated in FIG. 9 is similar to the bandwidth controller 502 illustrated in FIG. 5, except that a token-threshold table 920 is added, a token controller 912 is provided in place of the token controller 512, and the token controller 912 generates a token-threshold-excess status signal.

The queue selector 904 illustrated in FIG. 9 is similar to the queue selector 504 illustrated in FIG. 5, except that the trigger counters 526 and the priority-control-threshold storage section 530 are not provided, a token-threshold-excess status flag 934 is added instead thereof, and a status monitor 922 is provided in place of the status monitor 522.

In FIG. 9, elements that are substantially the same as or that correspond to those of the buffer read controller 406 illustrated in FIG. 5 are denoted by the same reference numerals. Since the operations and the functions of the elements illustrated in FIG. 9 and denoted by the same reference numerals are substantially the same as those described above with reference to FIG. 5, detailed descriptions thereof are not given hereinafter.

[2-1-1. Bandwidth Control]

Bandwidth control (token control) performed by the bandwidth controller 902 will be described first.

Similarly to the token controller 512 illustrated in FIG. 5, the token controller 912 in the bandwidth controller 902 refers to the added-token values, stored in the token table 514, and the maximum token values, stored in the maximum-value table 516, to thereby control the count operations of the token counters 518-1 to 518-n.

The token-threshold table 920 contains multiple accumulated-token thresholds for the respective queues. The accumulated-token thresholds are preset for the respective queues. Each accumulated-token threshold is a reference value that the corresponding token counter 518 uses to determine whether or not a sufficient amount of tokens is stored. Each accumulated-token threshold is a larger value than the above-described threshold for determining the state of the token-status signal.

The token controller 912 generates token-threshold-excess status signals for the corresponding queues and supplies the token-threshold-excess status signals to the queue selector 904. Each of the token-threshold-excess status signals indicates whether or not the accumulated-token value is larger than or equal to the corresponding accumulated-token threshold and also indicates whether or not a sufficient amount of tokens is accumulated for the corresponding queue.

The token controller 912 refers to the accumulated-token thresholds, stored in the token-threshold table 920, to determine whether the count values (the accumulated-token values) of the token counters 518-1 to 518-n are larger than or equal to the corresponding accumulated-token thresholds. Upon determining that any of the count values (the accumulated-token values) of the token counters 518 is larger than or equal to the corresponding accumulated-token threshold, the token controller 912 puts the token-threshold-excess status signal for the corresponding queue into an ON state (e.g., a high level). On the other hand, upon determining that any of the count values (the accumulated-token values) of the token counters 518 is smaller than the corresponding accumulated-token threshold, the token controller 912 puts the token-threshold-excess status signal for the corresponding queue into an OFF state (e.g., a low level).

Similarly to the token controller 512 illustrated in FIG. 5, the token controller 912 generates token-status signals for the respective queues and supplies the token-status signals to the queue selector 904. The token-status signals are analogous to those described above with reference to FIG. 5.

[2-1-2. Measurement of Duration Time of Transmittable State and Priority Control for Queue Selection]

Next, a description will be given of measurement of the duration time of the transmittable state and priority control for queue selection, the measurement and the priority control being performed by the queue selector 904.

The status monitor 922 in the queue selector 904 receives the token-status signals and the token-threshold-excess status signals from the token controller 912 and also receives the queue-status signals from the queue manager 404. The status monitor 922 monitors, for each queue, the state of the token-status signal, the state of the token-threshold-excess status signal, and the state of the queue-status signal.

Similarly to the status monitor 522 illustrated in FIG. 5, the status monitor 922 determines, for each queue, whether or not it is in the transmittable state, in accordance with the state of the corresponding token-status signal and the state of the corresponding queue-status signal, to control the state of the corresponding transmittable flag in the transmittable-status flag 524.

The token-threshold-excess status flag 934 includes multiple threshold-excess flags for the respective queues. Each of the threshold-excess flags indicates whether or not the corresponding token-threshold-excess status signal is in an ON state, i.e., whether or not a sufficient amount of tokens is accumulated for the corresponding queue.

When the token-threshold-excess status signal for one queue is in an ON state (e.g., at a high level), the status monitor 922 sets the corresponding threshold-excess flag to the ON state. On the other hand, when the token-threshold-excess status signal for one queue is in an OFF state, the status monitor 922 sets the corresponding threshold-excess flag to the OFF state.

In response to a packet transmission trigger, a queue selection controller 928 refers to the states of the transmittable flags in the transmittable-status flag 524 and the states of the threshold-excess flags in the token-threshold-excess status flag 934 to monitor the duration times of the transmittable states for the respective queues and preferentially performs priority control for selecting, from the multiple queues, any queue whose duration time of the transmittable state is greater than a predetermined threshold as a transmission source. The packet transmission trigger is substantially the same as the packet transmission trigger described above with reference to FIG. 5 in connection with the queue selection controller 528.

The queue selector 904 performs the priority control as described below.

The queue selection controller 928 monitors, for each queue, the state of the corresponding transmittable flag and the state of the corresponding threshold-excess flag. When the transmittable flag for one queue is turned on, the queue selection controller 928 determines that the queue has entered the transmittable state, and subsequently, when the corresponding threshold-excess flag is turned on, the queue selection controller 928 determines that the duration time of the transmittable state of the queue has exceeded the predetermined threshold. That is, with respect to the queue whose transmittable flag and threshold-excess flag both indicate the ON states, the queue selection controller 928 determines that the duration time of the transmittable state has exceeded the certain threshold.

When the threshold-excess flag is turned on, this means that a sufficient amount of tokens is accumulated for the corresponding queue. Thus, when the threshold-excess flag for one queue in the transmittable state is turned on, this means that a state in which transmittable packet data in the queue is not transmitted and no tokens are used has been continuing.

The queue selection controller 928 preferentially selects, as a transmission source, any queue whose transmittable flag and threshold-excess flag are both in the ON states. The queue selection controller 928 generates identification information of the queue selected based on the priority control (i.e., the selected-queue identification information) and supplies the selected-queue identification information to the queue manager 404.

When two or more queues are selected as transmission sources on the basis of the priority control, the queue selection controller 928 sequentially selects the transmission-source queues from the selected two or more priority queues one by one on the Round robin (RR) basis and sequentially generates corresponding selected-queue identification information.

When no queue is selected as a transmission source on the basis of the priority control, the queue selection controller 928 uses the Round Robin (RR) to sequentially select transmission-source queues one by one from all queues from which data are to be output to the same output port (physical line) and sequentially generates corresponding selected-queue identification information.

There are also cases in which a transmission bandwidth is not sufficient, for example, a case in which the entire bandwidth of one output port (the physical line) to which data are to be output from the queues is used. In such a case, in the above-described priority control, even when a queue that can be selected as a transmission source exists, the queue selection controller 928 does not select the queue and delays the selection thereof until a bandwidth becomes available.

As in the case of the buffer read controller 406 illustrated in FIG. 5, the packet-data reader 508 reads packet data from the packet buffer 312 on the basis of the selected-queue read address supplied from the queue manager 404 and supplies the packet data to the output interface 314.

On the other hand, similarly to the token controller 512 illustrated in FIG. 5, the token controller 912 in the bandwidth controller 902 determines a token value corresponding to the packet length of the read packet data on the basis of the selected-queue packet-length information supplied from the queue manager 404 and updates the count value (the accumulated-token value) of the token counter 518 for the selected queue on the basis of the determined token value. On the basis of the updated count value (the accumulated-token value), the bandwidth controller 902 continues the bandwidth control (token control) for the corresponding queue.

As described above, the queue selector 904 in the buffer read controller 906 according to the second embodiment monitors the duration times of the transmittable states for the respective queues and performs priority control for preferentially selecting, from the multiple queues, the queue whose duration time is greater than the predetermined threshold as the transmission source. Thus, under the situation in which an insufficient transmission bandwidth of the corresponding output port (the physical line) causes any of the queues to wait for packet transmission even when it is in the transmittable state, the buffer read controller 906 can preferentially selects the queue whose duration time of the transmittable state is greater.

Hence, it is possible to inhibit an increase in the amount of data burst-transferred during packet transmission, the burst transfer resulting from an increase in the amount of tokens accumulated for each queue (i.e., an increase in the accumulated-token value), and it is also possible to inhibit an increase in packet-transmission fluctuations during the burst transfer.

Unlike the buffer read controller 406, the buffer read controller 906 in the second embodiment is adapted to measure the duration time of the transmittable state for each queue on the basis of the flag information of the token-threshold-excess status flag 934, without using the counters. This arrangement can more simplify the internal configuration of the queue selector 904, compared to the queue selector 504 illustrated in FIG. 5, and can offer substantially the same advantages as those described above without increasing the overall circuit and device sizes.

[2-2. Packet Transmission Control of Packet Buffer Controller 910]

Next, a description will be given of packet transmission control processing executed by the packet buffer controller 910 in the packet transmission device 900.

[2-2-1. Processing Executed Upon Generation of Token Addition Trigger]

Figure 10:
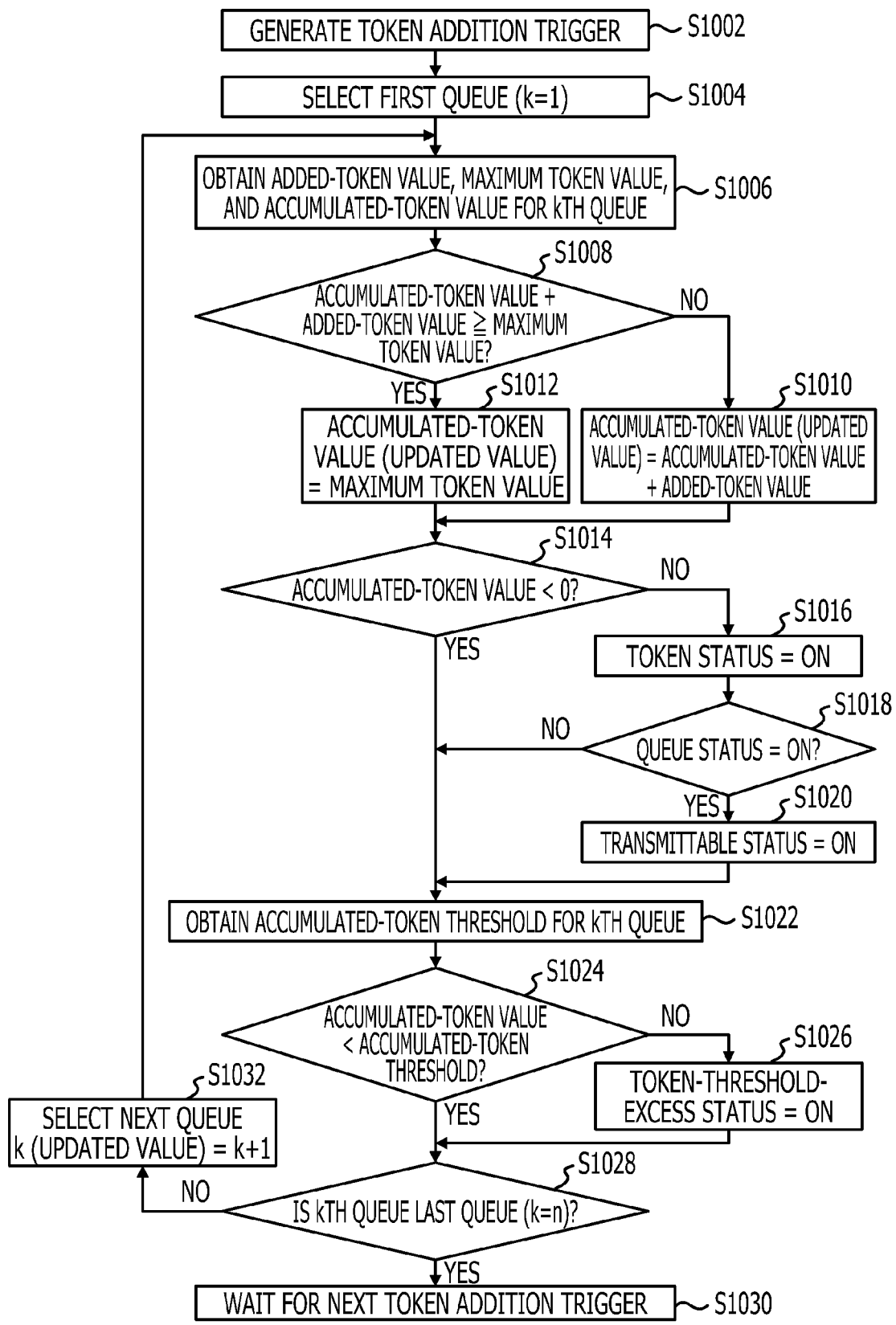
FIG. 10 is a flowchart illustrating details of packet-transmission control processing that a packet buffer controller executes upon generation of a token addition trigger.

FIG. 10 is a flowchart illustrating details of packet-transmission control processing executed by the packet buffer controller 910 upon generation of a token addition trigger.

The processing from operations S1002 to S1012 is analogous to the processing from operations S602 to S612 illustrated in FIG. 6. Hence, a detailed description of the processing is not given hereinafter. After operations S1012 and S1010, the process proceeds to operation S1014.

The processing from operations S1014 to S1020 is analogous to the processing from operations S620 to S626 illustrated in FIG. 6. Hence, a detailed description of the processing is not given hereinafter. When the accumulated-token value is a negative value in operation S1014 or when the queue-status signal is not in the ON state in operation S1018, the process proceeds to operation S1022. After operation S1020, the process also proceeds to operation S1022.

In operation S1022, the token controller 912 in the bandwidth controller 902 obtains an accumulated-token threshold for the kth queue. The token controller 912 refers to the token-threshold table 920 to obtain the accumulated-token threshold for the kth queue.

In operation S1024, the token controller 912 determines whether or not the accumulated-token value updated in operation S1010 or S1012 is smaller than the accumulated-token threshold obtained in operation S1022. When the result of the determination indicates that the accumulated-token value is larger than or equal to the accumulated-token threshold, the process proceeds to operation S1026. When the accumulated-token value is smaller than the accumulated-token threshold, the process proceeds to operation S1028.

In operation S1026, the token controller 912 determines that a sufficient amount of tokens is accumulated for the kth queue and sets the token-threshold-excess status signal for the kth queue to an ON state (e.g., a high level). Upon setting of the token-threshold-excess status signal for the kth queue to the ON state, the status monitor 922 in the queue selector 904 sets, in the token-threshold-excess status flag 934, the threshold-excess flag for the kth queue to an ON state (e.g., a high level).

The processing from operations S1028 to S1032 is analogous to the processing from operations S628 to S632 illustrated in FIG. 6. Hence, a detailed description of the processing is not given hereinafter.

In the above-described series of processing in operations S1002 to S1032, upon generation of the token addition trigger, the packet buffer controller 910 can appropriately set, for each queue, the state of the token-status signal and the state of the transmittable status flag in accordance with the amount of tokens accumulated for the queue (i.e., the accumulated-token value).

In addition, on the basis of the state of the threshold-excess flag in the token-threshold-excess status flag 934, the packet buffer controller 910 monitors the amount of tokens accumulated for each queue (i.e., the accumulated-token value), to thereby make it possible to appropriately determine that whether or not the duration time of the transmittable state of the queue exceeds the certain threshold.

[2-2-2. Processing Executed Upon Reception of Packet]

Figure 11:
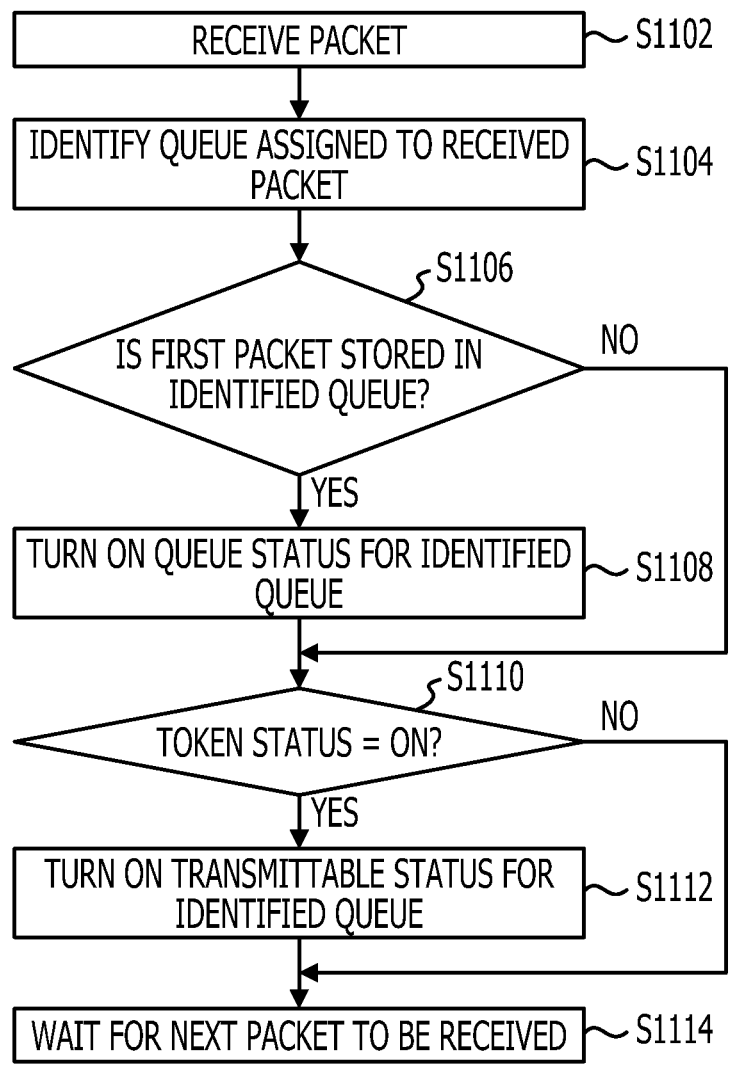
FIG. 11 is a flowchart illustrating details of packet-transmission control processing that the packet buffer controller executes upon reception of a packet.

FIG. 11 is a flowchart illustrating details of packet-transmission control processing that the packet buffer controller 910 executes upon reception of a packet.

The processing from operations S1102 to S1114 is analogous to the processing from operations S702 to S714 illustrated in FIG. 7. Hence, a detailed description of the processing is not given hereinafter.

In the series of processing in operations S1102 to S1114, upon reception of a packet, the packet buffer controller 910 can appropriately set the state of the queue-status signal and the state of the transmittable status flag for each queue.

[2-2-3. Processing Executed in Response to Packet Transmission Trigger]

Figure 12:
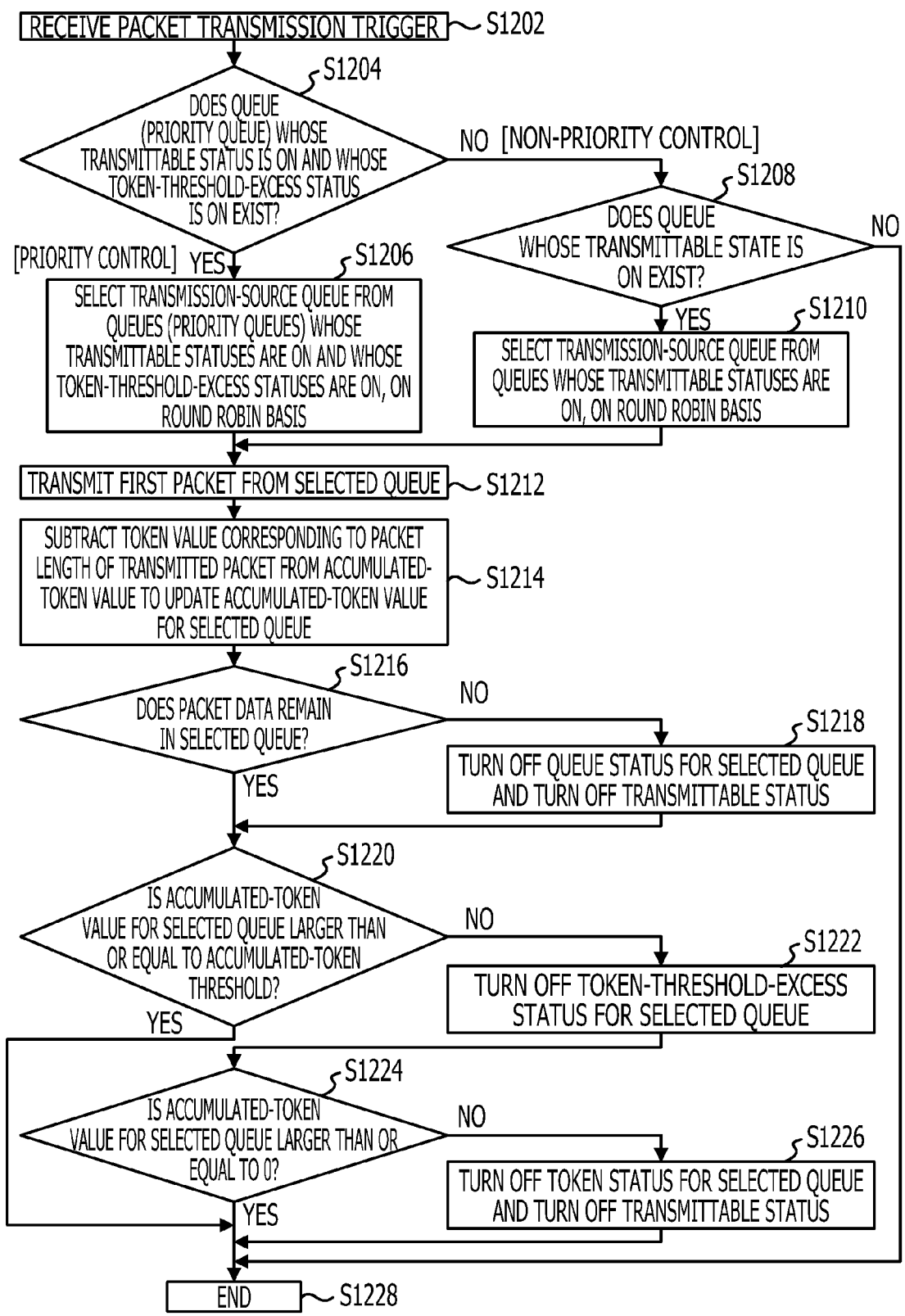
FIG. 12 is a flowchart illustrating details of packet-transmission control processing that the packet buffer controller executes in response to a packet transmission trigger.

FIG. 12 is a flowchart illustrating details of packet-transmission control processing executed in response to a packet transmission trigger.

In operation S1202, the queue selection controller 928 in the queue selector 904 receives a packet transmission trigger. The packet transmission trigger is analogous to the packet transmission trigger described above with reference to FIG. 5 in connection with the queue selection controller 528.

In operation S1204, the queue selection controller 928 checks the state of the transmittable-status flag 524 and the state of the token-threshold-excess status flag 934. The queue selection controller 928 determines whether or not any queue (i.e., any priority queue) whose transmittable flag in the transmittable-status flag 524 is in the ON state and whose threshold-excess flag in the token-threshold-excess status flag 934 is in the ON state exists in the multiple queues. When the result of the determination indicates that any priority queue exists, the process proceeds to operation S1206. When no priority queue exists, the process proceeds to operation S1208.

In operation S1206, when the number of priority queues in the multiple queues is two or more, the queue selection controller 928 selects one of the priority queues as a transmission source on the Round Robin basis. When only one priority queue exists, the queue selection controller 928 selects the priority queue as a transmission source. The queue selection controller 928 notifies the queue manager 404 about the identification information of the selected queue (i.e., the selected-queue identification information). After operation S1206, the process proceeds to operation S1212.

In operation S1208, the queue selection controller 928 determines whether or not any queue whose transmittable flag in the transmittable-status flag 524 is in the ON state exists in the multiple queues. When the result of the determination indicates that any queue whose transmittable flag is in the ON state exists, the process proceeds to operation S1210. When the result of the determination indicates that any queue whose transmittable flag is in the ON state does not exist, the process proceeds to operation S1228.

In operation S1210, when the number of queues whose transmittable flags are in the ON states is two or more, the queue selection controller 928 selects one of the queues as a transmission source on the Round Robin basis. When the number of queues whose transmittable flags are in the ON states is only one, the queue selection controller 928 selects the queue as a transmission source. The queue selection controller 928 notifies the queue manager 404 about the identification information of the selected queue (i.e., the selected-queue identification information). After operation S1206, the process proceeds to operation S1212.

The processing from operations S1212 to S1218 is analogous to the processing from operations S812 to S818 illustrated in FIG. 8, except that the token addition count is not reset in operation S1214. Hence, a detailed description of the processing is not given hereinafter. After operations S1216 and S1218, the process proceeds to operation S1220.

In operation S1220, the token controller 912 in the bandwidth controller 902 refers to the token-threshold table 920 to obtain the accumulated-token threshold for the selected queue. The token controller 912 further refers to the count value of the token counter 518 for the selected queue after the update performed in operation S1214, to thereby obtain an accumulated-token value for the selected queue after the packet-data outputting performed in operation S1212. The token controller 912 then determines whether or not the updated value of the accumulated-token value for the selected queue is larger than or equal to the accumulated-token threshold. When the result of the determination indicates that the updated value of the accumulated-token value is smaller than the accumulated-token threshold, the process proceeds to operation S1222. When the updated value of the accumulated-token value is larger than or equal to the accumulated-token threshold, the process proceeds to operation S1228.

In operation S1222, the token controller 912 determines that a sufficient amount of tokens does not remain in the selected queue and sets the token-threshold-excess status signal for the selected queue to an OFF state (e.g., a low level). Upon the change of the token-threshold-excess queue-status signal to the OFF state, the status monitor 922 in the status monitor 906 sets, in the token-threshold-excess status flag 934, the threshold-excess flag for the selected queue to the OFF state. After operation S1222, the process proceeds to operation S1224.

The processing from operations S1224 to S1228 is analogous to the processing from operations S820 to S824 illustrated in FIG. 8. Hence, a detailed description of the processing is not given hereinafter.

In the above-described series of processing in operations S1202 to S1228, during selection of the transmission-source queue upon reception of the packet transmission trigger, the packet-buffer controller 910 can determine whether or not the priority control is to be performed, in accordance with the state of the token-threshold-excess status flag for each queue. Thus, with respect to each queue, it is possible to appropriately perform the priority control according to the duration time of the transmittable state of the queue.

With this arrangement, under the situation in which an insufficient transmission bandwidth of the corresponding output port (physical line) causes any of the queues to wait for packet transmission even when the queue is in the transmittable state, the queue whose duration time of the transmittable state is greater can also be preferentially selected as a transmission source. Hence, it is possible to inhibit an increase in the amount of data burst-transferred during packet transmission, the burst transfer resulting from an increase in the amount of tokens accumulated for each queue (i.e., an increase in the accumulated-token value), and it is also possible to inhibit an increase in packet-transmission fluctuations during the burst transfer.

In addition, even after the packet data is output from the selected queue, the packet-buffer controller 910 can appropriately set the state of the token-threshold-excess flag and the state of the transmittable status flag for each queue.

[2-2-4. Modification of Packet-Buffer Controller]

As in the case of the first embodiment, the packet transmission control processing illustrated in FIGS. 10 to 12 may also be realized with software, instead of the hardware illustrated in FIGS. 4 and 9, by causing a program to execute the various types of processing illustrated in FIGS. 10 to 12.

In such a case, the packet-buffer controller 910 may include, for example, a program memory for storing a program (a packet buffer control program) that implements the processing in the operations illustrated in FIGS. 10 to 12, a processor that can execute the program, and a work memory that provides a work area for computation processing performed by the processor.

By using the work memory to execute the packet buffer control program stored in the program memory, the processor in the packet-buffer controller 910 can execute processing that is equivalent to the processing executed by cooperation of the elements (illustrated in FIG. 4) in the packet-buffer controller 910.

3. Third Embodiment

A description below will be given of a packet transmission device and a packet transmission method according to a third embodiment.

[3-1. Internal Configuration of Buffer Read Controller 1306]

The configuration of a packet transmission device 1300 according to a third embodiment is similar to the configurations of the packet transmission device 300 illustrated in FIGS. 3 to 5 and the configuration of the packet transmission device 900 illustrated in FIG. 9, except for the internal configuration of the buffer read controller included in the packet buffer controller. Hence, the overall configuration of the packet transmission device 1300 according to the third embodiment is neither described nor illustrated, and a description will be given of the internal configuration of a buffer read controller 1306 in a packet buffer controller 1310 (not illustrated) in the third embodiment.

Figure 13:
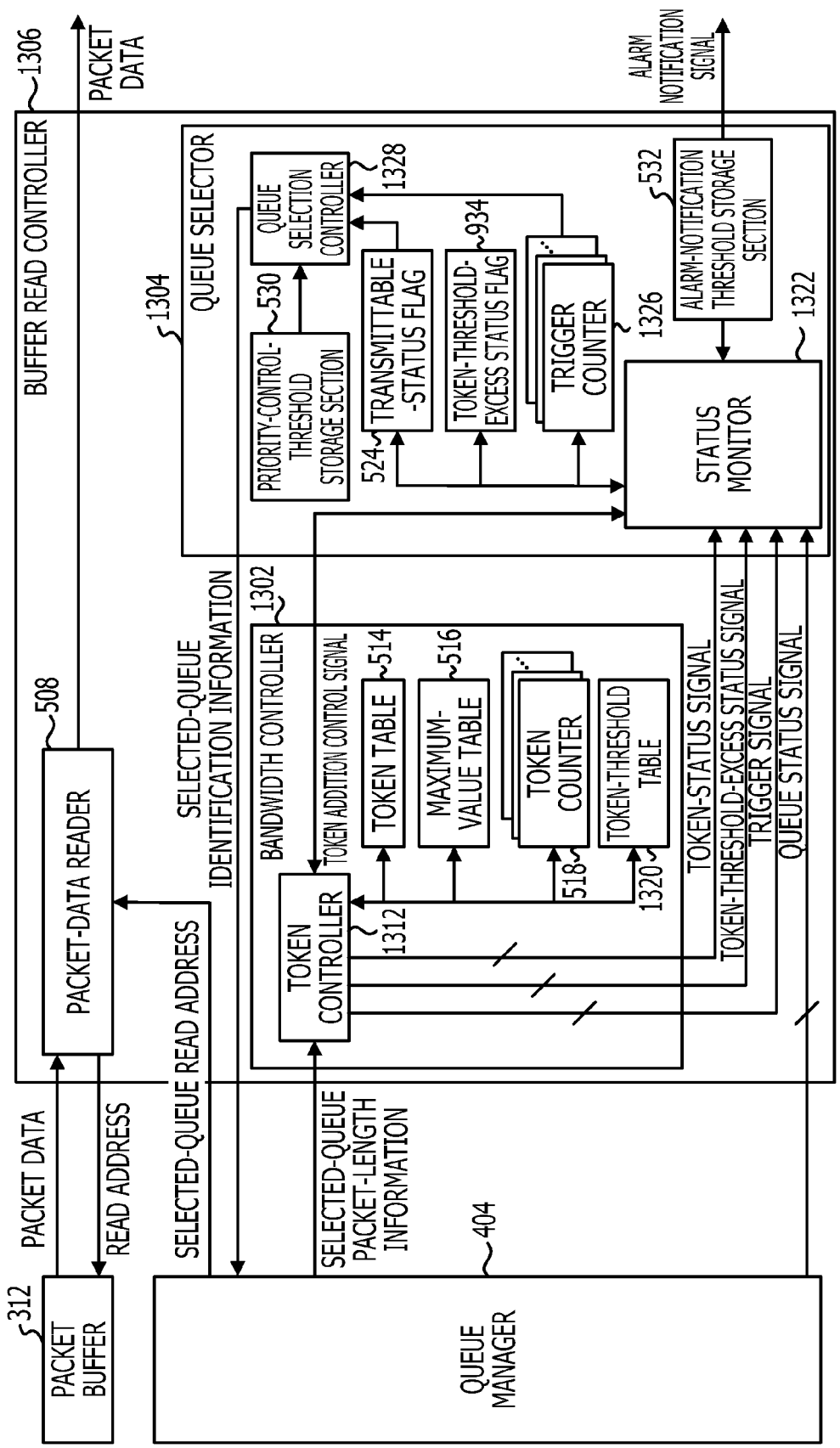
FIG. 13 is a block diagram illustrating one example of the internal configuration of a buffer read controller in a third embodiment.

FIG. 13 is a block diagram illustrating one example of the internal configuration of the buffer read controller 1306 in the third embodiment. The configuration of the buffer read controller 1306 is similar to the configurations of the buffer read controller 406 illustrated in FIG. 5 and the configuration of the buffer read controller 906 illustrated in FIG. 9, except for the internal configurations of the bandwidth controller and the queue selector.

A bandwidth controller 1302 illustrated in FIG. 13 is similar to the bandwidth controller 502 illustrated in FIG. 5 and the bandwidth controller 902 illustrated in FIG. 9, except that a token-threshold table 1320 is added, a token controller 1312 is provided in place of the token controller 512 and the token controller 912, and the token controller 1312 generates two types of signals, i.e., trigger signals and token-threshold-excess status signals.

A queue selector 1304 illustrated in FIG. 13 is similar to the queue selector 504 illustrated in FIG. 5 and the queue selector 904 illustrated in FIG. 9, except that trigger counters 1326 are provided in place of the trigger counters 526, the token-threshold-status flag 934 is also provided in conjunction with the trigger counters 1326, and a status monitor 1322 is provided in place of the status monitors 522 and 922.

In FIG. 13, elements that are substantially the same as or that correspond to those in the buffer read controller 406 illustrated FIG. 5 are denoted by the same reference numerals and elements that are substantially the same as or that correspond to those in the buffer read controller 906 illustrated FIG. 9 are also denoted by the same reference numerals. Since the operations and the functions of the elements illustrated in FIG. 13 and denoted by the same reference numerals are substantially the same as those described above with reference to FIGS. 5 and 9, detailed descriptions thereof are not given hereinafter.

[3-1-1. Bandwidth Control]

Bandwidth control (token control) performed by the bandwidth controller 1302 will be described first.

Similarly to the token controller 512 illustrated in FIG. 5, the token controller 1312 in the bandwidth controller 1302 refers to the added-token values, stored in the token table 514, and the maximum token values, stored in the maximum-value table 516, to thereby control the count operations of the token counters 518-1 to 518-$n$.

The token-threshold table 1320 contains multiple accumulated-token generation thresholds and multiple accumulated-token releasing thresholds for the respective queues.

The accumulated-token generation thresholds are preset for the respective queues. Each accumulated-token generation threshold is a first reference value that the corresponding token counter 518 uses to determine whether or not a sufficient amount of tokens is stored. Each accumulated-token generation threshold is a larger value than the above-described threshold for determining the state of the token-status signal.

The accumulated-token releasing thresholds are preset for the respective queues. Each accumulated-token releasing threshold is a second reference value that the corresponding token counter 518 uses to determine whether or not a sufficient amount of tokens is stored. Each of the accumulated-token releasing threshold is also a reference value for the corresponding token counter 518 to determine whether or not token addition processing described below is to be executed. Each accumulated-token releasing threshold is a larger value than the above-described threshold for determining the state of the token-status signal. It is preferable that each of the accumulated-token releasing thresholds be smaller than the accumulated-token generation threshold for the same queue and the difference between the accumulated-token generation threshold and the accumulated-token releasing threshold for the same queue be larger than the token value corresponding to the packet length of the packet data output from the packet-data reader 508. The accumulated-token releasing thresholds, however, may be the same value as the corresponding accumulated-token generation thresholds.

The token controller 1312 refers to the accumulated-token generation thresholds and the accumulated-token releasing thresholds, stored in the token-threshold table 1320, to generate token-threshold-excess status signals for the respective queues and supplies the token-threshold-excess status signals to the status monitor 1322.

The token controller 1312 determines whether or not the count values (the accumulated-token values) of the token counters 518-1 to 518-$n$ are larger than or equal to the corresponding accumulated-token generation thresholds. Upon determining that any of the count values (the accumulated-token values) of the token counters 518 is larger than or equal to the corresponding accumulated-token generation threshold, the token controller 912 puts the token-threshold-excess status signal for the corresponding queue into an ON state (e.g., a high level). The token controller 1312 also determines whether or not the count values (the accumulated-token values) of the token counters 518-1 to 518-$n$ are larger than or equal to the corresponding accumulated-token releasing thresholds. Upon determining that any of the count values (the accumulated-token values) of the token counters 518 is smaller than the corresponding accumulated-token releasing threshold, the token controller 1312 puts the token-threshold-excess status signal for the corresponding queue into an OFF state (e.g., a low level). Since the accumulated-token generation thresholds and the accumulated-token releasing thresholds are independently provided as described above, the token controller 1312 can add a hysteresis characteristic to the ON state and OFF state of the token-threshold-excess status signals.

Similarly to the token controller 512 illustrated in FIG. 5, the token controller 1312 generates token-status signals and trigger signals for the respective queues and supplies the token-status signals and the trigger signals to the status monitor 1322. The token-status signals and the trigger signals are analogous to those described above with reference to FIG. 5.

[3-1-2. Measurement of Duration Time of Transmittable State]

Next, a description will be given of measurement of the duration time of the transmittable state for each queue, the measurement being performed by the queue selector 1304.

The status monitor 1322 in the queue selector 1304 receives the token-status signals, the trigger signals, and the token-threshold-excess status signals from the token controller 1312 and also receives the queue-status signals from the queue manager 404. The status monitor 1322 monitors, for each queue, the state of the token-status signal, the state of the queue-status signal, and the state of the token-threshold-excess status signal.

Similarly to the status monitor 522 illustrated in FIG. 5, the status monitor 1322 determines, for each queue, whether or not it is in the transmittable state, in accordance with the state of the corresponding token-status signal and the state of the corresponding queue-status signal, to control the state of the corresponding transmittable flag in the transmittable-status flag 524.

Similarly to the status monitor 922 illustrated in FIG. 9, the status monitor 1322 controls, for each queue, the state of the corresponding threshold-excess flag in the token-threshold-excess status flag 934 in accordance with the state of the corresponding token-threshold-excess status signal.

When both of the transmittable flag for one queue in the transmittable-status flag 524 and the corresponding threshold-excess flag in the token-threshold-excess status flag 934 indicate the ON states, the status monitor 1322 determines that the queue is a queue that has been in the transmittable state for a certain amount of time or more and that is to serve as a candidate for token addition processing (i.e., a token-addition candidate queue) described below. The status monitor 1322 reports control information indicating that the queue is a token-addition candidate queue to the token controller 1312 as part of token-addition control information.

The token controller 1312 receives the control information of the token-addition candidate queue from the status monitor 1322. On the basis of the received control information, the token controller 1312 stops the count operation of the token counter 518 for the token-addition candidate queue. That is, even when the added-token value and the token addition trigger are supplied and the timing at which the tokens are to be added is reached, the token counter 518 for the token-addition candidate queue does not update the count value and discards the tokens that are supposed to be added. This because, even if the count operation is continued to continue the token addition, the count value (the accumulated-token value) of the token counter 518 reaches the maximum token value and tokens that are supposed to be able to be added are not added, since the count value has already exceeded the accumulated-token generation threshold.

Even when the count operation of the token counter 518 is stopped, the count operation of the trigger counter 1326 is started instead as described below. Thus, the amount of tokens to be discarded without being added is held as the count value of the trigger counter 1326 (i.e., as a token discard count).

In addition, the status monitor 1322 controls the count operations of the trigger counters 1326-1 to 1326-$n$. The trigger counters 1326 (1326-1 to 1326-$n$) are provided so as to correspond to the respective queues. Under the control of the status monitor 1322, each of the trigger counters 1326-1 to 1326-$n$ counts the number of triggers of the corresponding signal supplied to the status monitor 1322 in a period in which the corresponding queue is in the transmittable state and the corresponding accumulated-token value exceeds the accumulated-token generation threshold.

The trigger signal indicates the token addition timing at the corresponding token counter 518. As described above, in the period in which the corresponding queue is in the transmittable state and the corresponding accumulated-token value exceeds the accumulated-token generation threshold, the corresponding token counter 518 stops the update of the count value thereof. As a result, each of the count values of the trigger counters 1326-1 to 1326-$n$ corresponds to the number of times tokens are discarded without being added (i.e., the token discard count) even though the tokens are supposed to be added with respect to a queue in the transmittable state after the corresponding accumulated-token value exceeds the accumulated-token generation threshold.

Since the period of the trigger signal does not change (and is the same as the period of the token-addition trigger signals supplied to the token counters 518-1 to 518-$n$), the count values of the trigger counters 1326-1 to 1326-$n$ also indicate the duration times of the transmittable states of the corresponding queues after the corresponding accumulated token values exceed the accumulated-token generation thresholds.

In this case, when the accumulated-token value exceeds the accumulated-token generation threshold, this means that a sufficient amount of tokens is already stored in the corresponding queue. Thus, when the accumulated-token value for one queue in the transmittable state exceeds the accumulated-token generation threshold, this means that a state in which transmittable packet data in the queue in the transmittable state is not transmitted and no tokens are used has already been continuing for a certain amount of time. Accordingly, the count operation is started when the corresponding accumulated-token value has already exceeded the accumulated-token generation threshold and the transmittable state of the corresponding queue has already been continuing for a certain amount of time.

Accordingly, each of the count values of the trigger counters 1326-1 to 1326-$n$ indicates the duration time of the transmittable state of the corresponding queue and, more specifically, indicates the duration time of the transmittable state after the corresponding accumulated-token value exceeds the accumulated-token generation threshold. Thus, through the above-described count operations of the trigger counters 1326-1 to 1326-$n$, the status monitor 1322 can measure the duration times of the transmittable states for the respective queues.

The status monitor 1322 controls the count operations of the trigger counters 1326-1 to 1326-$n$, as described below.

When the transmittable flag in the transmittable-status flag 524 for one queue changes from the OFF state to the ON state and the threshold-excess flag in the token-threshold-excess status flag 934 changes from the OFF state to the ON state, the corresponding one of the trigger counters 1326-1 to 1326-$n$ starts the count operation for counting the number of triggers of the corresponding trigger signal. Thereafter, while both of the corresponding transmittable flag and the corresponding threshold-excess flag indicate the ON states, the corresponding one of the trigger counters 1326-1 to 1326-$n$ continuously counts the number of triggers of the trigger signal. When at least one of the corresponding transmittable flag and the corresponding threshold-excess flag changes from the ON state to the OFF state, the corresponding one of the trigger counters 1326-1 to 1326-n stops the count operation.

[3-1-3. Priority Control for Queue Selection]

Next, a description will be given of priority control for queue selection, the priority control being performed by the queue selector 1304.

In response to a packet transmission trigger, a queue selection controller 1328 refers to the states of the transmittable flags in the transmittable-status flag 524 and the states of the count values of the trigger counters 1326 to monitor the duration times of the transmittable states for the respective queues and performs priority control for preferentially selecting, from the multiple queues, any queue whose duration time of the transmittable state is greater than a predetermined threshold as a transmission source. The packet transmission trigger is analogous to the packet transmission trigger described above with reference to FIG. 5 in connection with the queue selection controller 528.

The queue selector 1304 performs the priority control as described below.

The queue selection controller 1328 refers to the priority-control-threshold storage section 530 to obtain a priority control threshold. The queue selection controller 1328 monitors, for each queue, the state of the transmittable flag and the count value of the trigger counter 1326 (i.e., the token discard count). The queue selection controller 1328 preferentially selects, from the multiple queues, the queue whose transmittable flag indicates the ON state and whose count value of the trigger counter 1326 (i.e., the token discard count) is larger than the obtained priority control threshold as a transmission source. The queue selection controller 1328 generates identification information of the queue selected by the priority control (i.e., the selected-queue identification information) and supplies the selected-queue identification information to the queue manager 404.

When two or more queues are selected as transmission sources on the basis of the priority control, the queue selection controller 1328 sequentially selects the transmission-source queues from the selected two or more priority queues one by one on the Round Robin (RR) basis and sequentially generates corresponding selected-queue identification information.

When no queue is selected as a transmission source on the basis of the priority control, the queue selection controller 1328 sequentially selects the transmission-source queues one by one from all the existing queues on the Round Robin (RR) basis and sequentially generates corresponding selected-queue identification information.

There are also cases in which a transmission bandwidth is not sufficient, for example, a case in which the entire transmission bandwidth of one output port (physical line) to which data are to be output from the queues is used. In such a case, in the above-described priority control, even when the queue that can be selected as a transmission source exists, the queue selection controller 1328 does not select the queue and delays the selection thereof until an available bandwidth is created in the transmission bandwidth.

As in the case of the buffer read controller 406 illustrated in FIG. 5, the packet-data reader 508 reads packet data from the packet buffer 312 on the basis of the selected-queue read address supplied from the queue manager 404 and supplies the packet data to the output interface 314.

As described above, the queue selector 1304 in the buffer read controller 1306 according to the third embodiment monitors the duration times of the transmittable states for the respective queues and performs priority control for preferentially selecting, from the multiple queues, the queue whose duration time is greater than the predetermined threshold as the transmission source. Thus, under the situation in which an insufficient transmission bandwidth of the corresponding output port (the physical line) causes any of the queues to wait for packet transmission even when it is in the transmittable state, the buffer read controller 1304 can preferentially selects the queue whose duration time of the transmittable state is longer.

Hence, it is possible to inhibit an increase in the amount of data burst-transferred during packet transmission, the burst transfer resulting from an increase in the amount of tokens accumulated for each queue (i.e., an increase in the accumulated-token value), and it is also possible to inhibit an increase in packet-transmission fluctuations during the burst transfer.

[3-1-4. Token Addition Processing]

Next, a description will be given of token addition control performed by the bandwidth controller 1302.

Similarly to the token controller 512 illustrated in FIG. 5, the token controller 1312 in the bandwidth controller 1302 determines a token value corresponding to the packet length of the packet data read from the packet buffer 312 on the basis of the selected-queue packet-length information supplied from the queue manager 404 and updates the count value (the accumulated-token value) of the token counter 518 for the selected queue on the basis of the determined token value.

The token controller 1312 refers to the token-threshold table 1320 to obtain the accumulated-token releasing threshold for the queue from which the packet data was transmitted. The token controller 1312 then determines whether or not the updated value of the count value (the accumulated-token value) of the token counter 518 is larger than or equal to the accumulated-token releasing threshold.

Upon determining that the updated value of the count value (the accumulated-token value) of the token counter 518 is larger than or equal to the accumulated-token releasing threshold, the token controller 1312 specifies the corresponding queue as a queue to be subjected to the token addition processing (i.e., as a token-addition target queue) and determines that the token addition processing for the queue is to be started. The token addition processing is processing in which, in the queue from which packet data was transmitted, some or all of the tokens that were supposed to be added but were discarded without being added are added at a later time. On the basis of the count value (the accumulated-token value) of the token counter 518 after the token addition processing, the bandwidth controller 1302 continuously performs the bandwidth control (token control) for each queue.

Upon determining that the count value (the accumulated-token value) of the token counter 518 is smaller than the accumulated-token releasing threshold, the token controller 1312 does not perform the token addition processing. On the basis of the updated value of the current token counter 518 (i.e., the updated value of the accumulated-token value), the bandwidth controller 502 continuously performs the bandwidth control (token control) for each queue.

The token controller 1312 exchanges token addition control information, including various types of control information, with the status monitor 1322 to control the token addition processing in the manner described below.

The token controller 1312 reports, as part of the token addition control information, the identification information of the token-addition target queue and control information indicating that the token addition processing is to be started to the status monitor 1322.

Upon receiving, from the token controller 1312, the identification information of the token-addition target queue and the control information indicating that the token addition processing is to be started, the status monitor 1322 refers to the count value of the trigger counter 1326 (i.e., the token discard count) for the token-addition target queue. As described above, the count value of the trigger counter 1326 corresponds to the number of times tokens for a queue in the transmittable state (i.e., the token discard count) are discarded without being added even though the tokens are supposed to be added after the corresponding accumulated-token value exceeds the accumulated-token generation threshold.

The status monitor 1322 determines whether or not the count value of the trigger counter 1326 (i.e., the token discard count) for the token-addition target queue is larger than or equal to 1. When the count value (i.e., the token discard count) is larger than or equal to 1, the status monitor 1322 determines that tokens that have not been added are included in the discarded tokens for the token-addition target queue, and reports, as part of the token addition control information, control information indicating that execution of the token addition processing is to be permitted to the token controller 1312. On the other hand, when the count value (i.e., the token discard count) is 0, the status monitor 1322 determines that the tokens that have not been added are not included in the discarded tokens, and reports, as part of the token addition control information, a control signal indicating that the token addition processing is to be ended to the token controller 1312.

Upon receiving the control information indicating that execution of the token addition processing is to be permitted from the status monitor 1322, the token controller 1312 refers to the token table 514 to obtain the added-token value for the token-addition target queue. The token controller 1312 supplies the obtained added-token value to the token counter 518 for the token-addition target queue. The token counter 518 for the token-addition target queue adds the added-token value to the current count value to thereby execute processing (token addition processing) for updating the count value (the accumulated-token value). When the token addition processing is performed, this means that the token value corresponding to one discarding operation is added at a later time with respect to the token-addition target queue. The token controller 1312 reports, as part of the token addition control information, the control information indicating that the token addition processing has been executed to the status monitor 1322.

Upon receiving the control information indicating that the token addition processing has been executed from the token controller 1312, the status monitor 1322 decrements the count number of the trigger counter 1326 for the corresponding token-addition target queue by 1 to thereby update the count value of the trigger counter 1326 (i.e., the token discard count). That is, the status monitor 1322 decrements the token discard count for the token-addition target queue by 1, so as to correspond to the operation in which the tokens corresponding to the single discarding operation were added at a later time in the token addition processing.

Upon reporting the control information indicating that the token addition processing has been executed, the token controller 1312 further refers to the token-threshold table 1320 to obtain the accumulated-token generation threshold for the token-addition target queue. The token controller 1312 determines whether or not the updated value of the count value (the accumulated-token value) of the token counter 518 is larger than or equal to the obtained accumulated-token generation threshold.

When the updated value of the count value (the accumulated-token value) of the token counter 518 is smaller than the accumulated-token generation threshold, the token controller 1312 determines that a sufficient amount of tokens is not stored in the token-addition target queue and reports control information indicating that the token addition processing is to be continued to the status monitor 1312 as part of the token addition control information. When the updated value of the count value (the accumulated-token value) is larger than or equal to the accumulated-token generation threshold, the token controller 1312 determines that a sufficient amount of tokens is stored in the token-addition target queue and reports, as part of the token addition control information, control information indicating that the token addition processing is to be ended to the status monitor 1322.

Upon receiving the control information indicating that the token addition processing is to be continued from the token controller 1312, the status monitor 1322 determines whether or not the updated value of the count value of the trigger counter 1326 (i.e., the token discard count) for the token-addition target queue is larger than or equal to 1. When the updated value of the count value (i.e., the token discard count) is larger than or equal to 1, the status monitor 1322 determines that tokens that have not been added remain in the discarded tokens for the token-addition target queue, and re-reports, as part of the token addition control information, control information indicating that execution of the token addition processing is to permitted to the token controller 1312. On the other hand, when the count value (i.e., the token discard count) is 0, the status monitor 1322 determines that the tokens that have not been added do not remain in the discarded tokens, and reports, as part of the token addition control information, a control signal indicating that the token addition processing is to be ended to the token controller 1312.

Upon receiving the control information indicating that execution of the token addition processing is to be permitted, the token controller 1312 re-executes the above-described token addition processing.

On the other hand, upon receiving the control information indicating that the token addition processing is to be ended from the status monitor 1322, the token controller 1312 does not execute the token addition processing.

Upon receiving the control information indicating that the token addition processing is to be ended from the token controller 1312, the status monitor 1322 clears the count value of the trigger counter 1326 (i.e., the token discard count) for the token-addition target queue (i.e., sets the count value to 0 (zero)).

In the above-described example of the token addition processing, after the token values corresponding to one discarding operation are added, a determination as to whether or not the token discard count after the update is one or more is made again, and the token values corresponding to the token discard count are added. The embodiment of the present disclosure, however, is not limited to the above-described example.

For example, when the count value of the trigger counter 1326 (i.e., the token discard count) for the corresponding token-addition target queue is 1 or more, the status monitor 1322 may update the count value (the accumulated-token value) by adding a token value corresponding to the token discard count (i.e., a value obtained by multiplying the added-token value by the token discard count) to the count value of the token counter 518 at a time.

As described above, the buffer read controller 1306 in the third embodiment is adapted such that the queue selector 1304 holds, for each queue, the amount of tokens that were supposed to be added but were discarded without being added because of a limitation of the maximum amount of tokens that can be accumulated and the bandwidth controller 1302 adds and accumulates, at a later time, some or all of the discarded tokens for the queues from which packet data was transmitted. This arrangement can reduce the amount of tokens wasted by the discarding when the amount of accumulated tokens exceeds the allowable maximum value.

Accordingly, even under a situation in which an insufficient transmission bandwidth of the corresponding output port (physical line) causes any of the queues to wait for packet transmission even when the queue is in the transmittable state, the amount of tokens accumulated for each queue can be practically increased. Thus, it is possible to inhibit a decrease in the data transfer rate of the packet data.

[3-1-5. Alarm Notification Processing]

Next, a description will be given of alarm notification processing performed by the queue selector 1304.

Similarly to the status monitor 522 illustrated in FIG. 5 the status monitor 1322 executes alarm notification processing. The status monitor 1322 refers to the alarm-notification-threshold storage section 532 to obtain an alarm notification threshold stored therein. The alarm notification threshold stored in the alarm-notification-threshold storage section 532 is a threshold corresponding to the count value of the trigger counter 1326 and also corresponding to the threshold for duration time of the transmittable state.

The status monitor 1322 monitors the count values of the trigger counters 1326. Upon determining that any of the count values of the trigger counters 1326 is larger than the alarm notification threshold, the status monitor 1322 outputs an alarm notification signal. The alarm notification signal may include the identification information of a queue whose count value of the trigger counter 1326 exceeds the alarm notification threshold or information such as the time of occurrence of the event.

The alarm notification signal is output to a control device (not illustrated) for comprehensively controlling various circuits, devices, or the like, including those illustrated in FIG. 13, in the packet transmission device 1300. The control device receives the alarm notification signal and stores the reception state of the alarm notification signal, for example, in the form of a log.

As described above, similarly to the buffer read controller 406 in the first embodiment, the buffer read controller 1306 in the third embodiment is adapted such that the status monitor 1322 outputs the alarm notification signal. Accordingly, for example, by referring to the aforementioned log, a network administrator can appropriately recognize the states of the bandwidth controls (token controls) performed by the packet transmission device 300 and can obtain statistical information indicating, for example, in which of the queues the duration time of the transmittable state is more likely to exceed the threshold.

With this arrangement, the network administrator can appropriately set various transmission parameters, such as the transmission bandwidth for each queue, the amount of tokens periodically added for each queue, and the maximum value of the amount of tokens accumulated and also can appropriately design the network.

[3-2. Packet Transmission Control of Packet Buffer Controller 1310]

Next, a description will be given of packet transmission control processing executed by the packet buffer controller 1310 in the packet transmission device 1300.

[3-2-1. Processing Executed Upon Generation of Token Addition Trigger]

Figure 14:
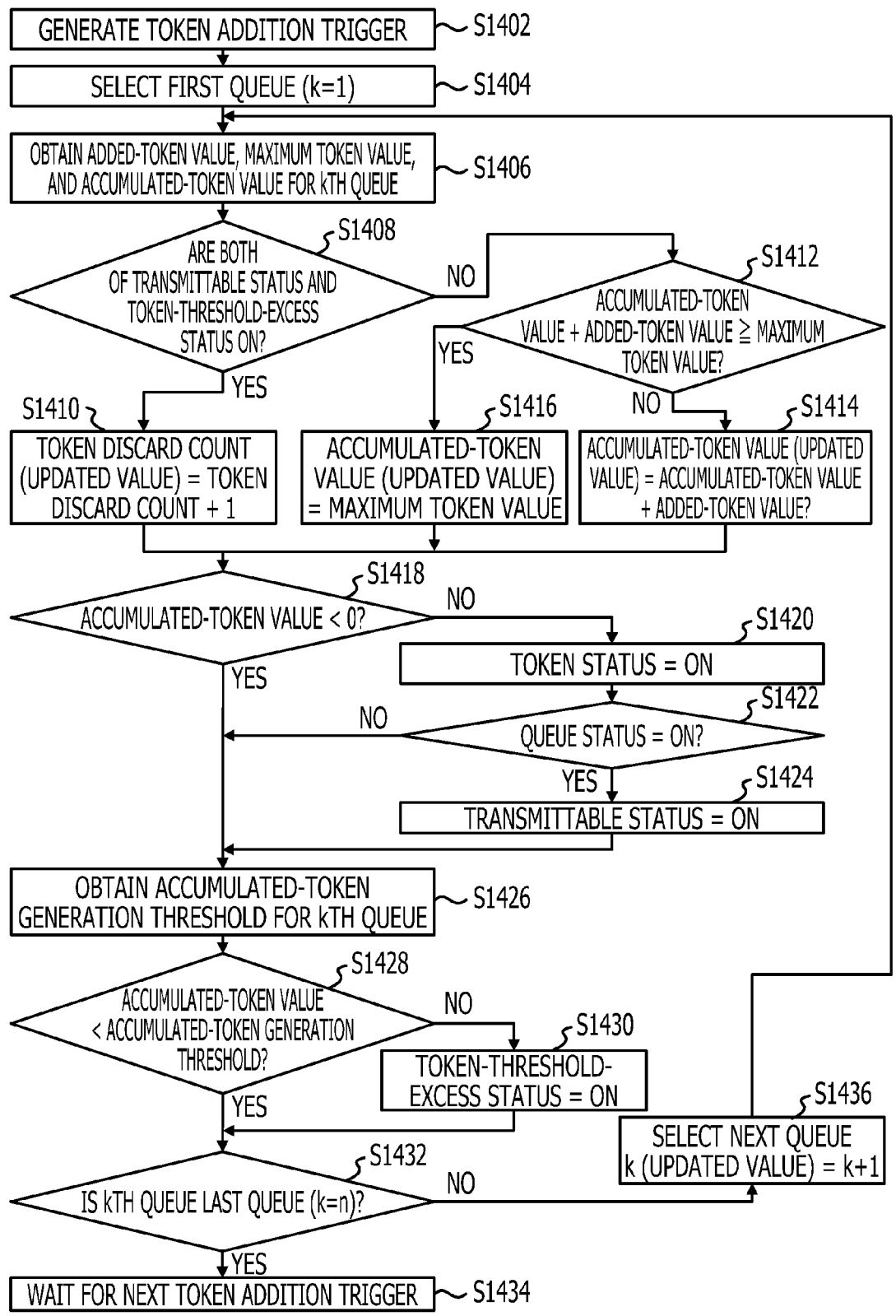
FIG. 14 is a flowchart illustrating details of packet-transmission control processing that a packet buffer controller executes upon generation of a token addition trigger.

FIG. 14 is a flowchart illustrating details of packet-transmission control processing that the packet buffer controller 1310 executes upon generation of a token addition trigger.

The processing from operations S1402 to S1406 is analogous to the processing from operations S602 to S606 illustrated in FIG. 6. Hence, a detailed description of the processing is not given hereinafter. After operation S1406, the process proceeds to operation S1408.

In operation S1408, the status monitor 1322 checks the state of the transmittable-status flag 524 and the state of the token-threshold-excess status flag 934. The status monitor 1322 determines whether or not the transmittable flag for the kth queue in the transmittable-status flag 524 is in the ON state and the threshold-excess flag for the kth queue in the token-threshold-excess status flag 934 is in the ON state. When the result of the determination indicates that both of the transmittable flag and the threshold-excess flag for the kth queue are in the ON sates, the process proceeds to operation S1410. When the result of the determination indicates that at least one of the transmittable flag and the threshold-excess flag for the kth queue is in the OFF sates, the process proceeds to operation S1412.

In operation S1410, the status monitor 1322 determines that the kth queue is a queue that has been in the transmittable state for a certain amount of time or more and that is to serve as a candidate for the token addition processing (i.e., a token-addition candidate queue) and the trigger counter 1326 for the kth queue counts the number of triggers of the trigger signal supplied from the token controller 1312. The trigger counter 1326 detects, from the trigger signal, a trigger corresponding to the token addition trigger generated in operation S1402 and increments the count value (i.e., the token discard count) by 1. As a result, the status monitor 1322 increments the value of the token discard count for the kth queue by 1 to thereby update the value of the token discard count.

At this point, the token counter 518 for the kth queue stops the count operation. Consequently, even when the added-token value and the token addition trigger are supplied from the token controller 1312 and the token addition timing is reached, the token counter 518 for the kth queue does not update the count value (the accumulated-token value) thereof.

The processing from operations S1412 to S1414 is analogous to the processing from operations S608 to S612 illustrated in FIG. 6. Hence, a detailed description of the processing is not given hereinafter. After operations S1414 and S1416, the process proceeds to operation S1418.

The processing from operations S1418 to S1424 is analogous to the processing from operations S620 to S626 illustrated in FIG. 6. Hence, a detailed description of the processing is not given hereinafter. When the accumulated-token value is a negative value in operation S1418 or when the queue-status signal is not in the ON state in operation S1422, the process proceeds to operation S1426. After operation S1424, the process also proceeds to operation S1426.

The processing from operations S1426 to S1430 is analogous to the processing from operations S1022 to S1026 illustrated in FIG. 10, except that the accumulated-token generation thresholds are used instead of the accumulated-token thresholds. Hence, a detailed description of the processing is not given hereinafter. When the accumulated-token value is smaller than the accumulated-token generation threshold in operation S1428, the process proceeds to operation S1432. After operation S1430, the process proceeds to operation S1432.

The processing from operations S1432 to S1436 is analogous to the processing from operations S628 to S632 illustrated in FIG. 6. Hence, a detailed description of the processing is not given hereinafter.

In the above-described series of processing in operations S1402 to S1436, upon generation of the token addition trigger, the packet buffer controller 1310 can appropriately set, for each queue, the state of the token-status signal and the state of the transmittable status flag in accordance with the amount of tokens accumulated for the queue (i.e., the accumulated-token value).

In addition, on the basis of the state of the threshold-excess flag in the token-threshold-excess status flag 934, the packet buffer controller 1310 monitors the amount of accumulated tokens (i.e., the accumulated-token value) for each queue. When both of the transmittable flag in the transmittable-status flag 524 and the threshold-excess flag in the token-threshold-excess status flag 934 are in the ON states, the packet buffer controller 1310 can appropriately measure the duration time of the transmittable state of the corresponding queue by appropriately counting the number of times the tokens for the queue are discarded.

[3-2-2. Processing Executed Upon Reception of Packet]

Figure 15:
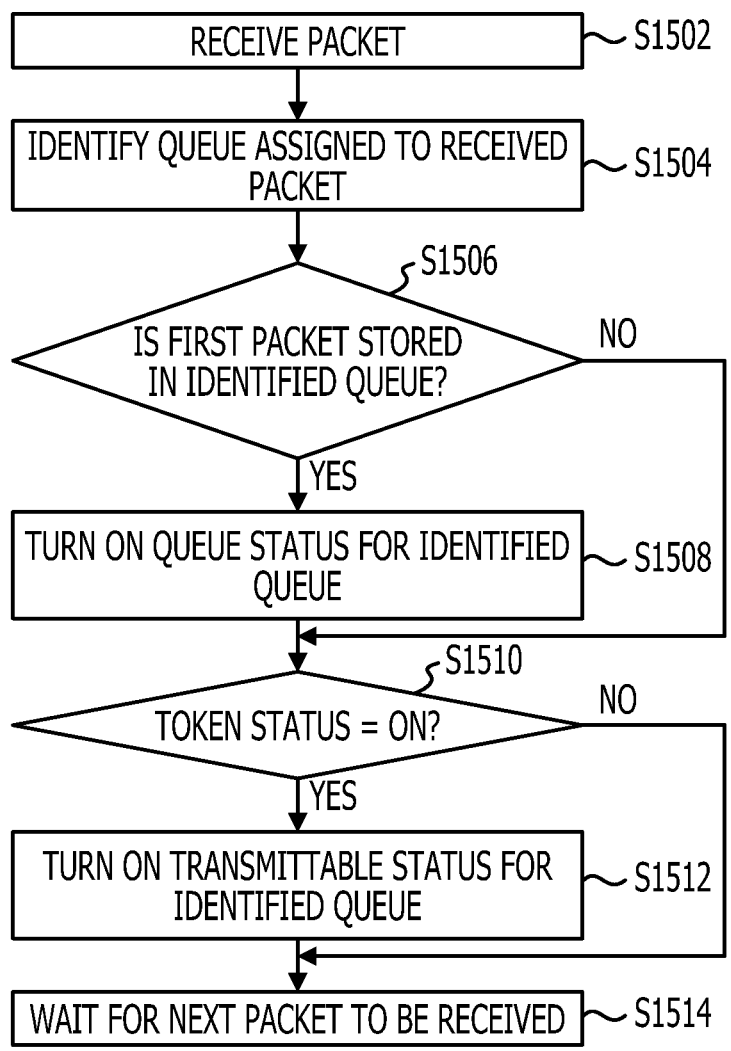
FIG. 15 is a flowchart illustrating details of packet-transmission control processing that the packet buffer controller executes upon reception of a packet.

FIG. 15 is a flowchart illustrating details of packet-transmission control processing that the packet buffer controller 1310 executes upon reception of a packet.

The processing from operations S1502 to S1514 is analogous to the processing from operations S702 to S714 illustrated in FIG. 7. Hence, a detailed description of the processing is not given hereinafter.

In the series of processing in operations S1505 to S1514, upon reception of a packet, the packet buffer controller 1310 can appropriately set the state of the queue-status signal and the state of the transmittable status flag for each queue.

[3-2-3. Processing Executed in Response to Packet Transmission Trigger]

Figure 16:
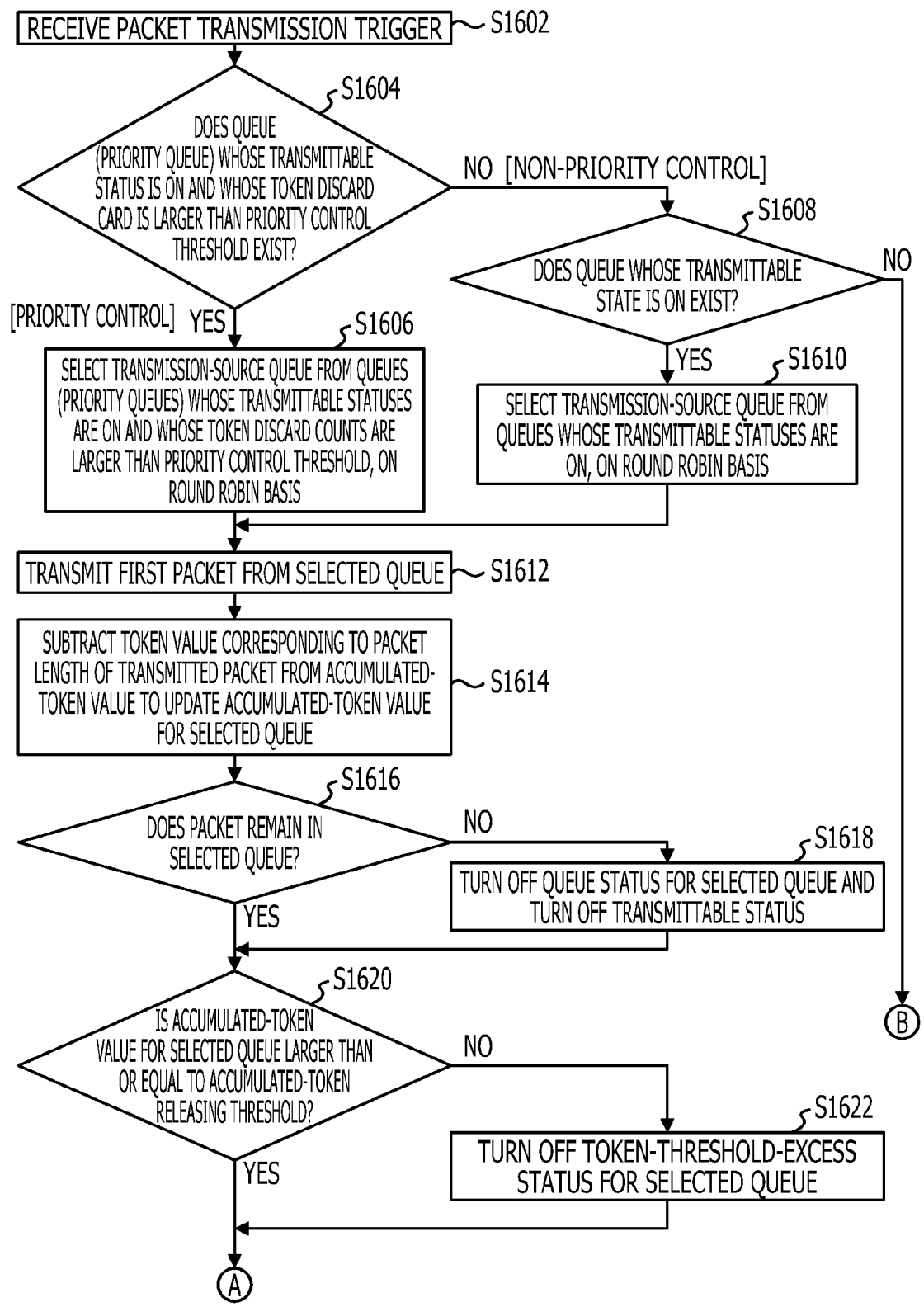
FIG. 16 is a flowchart illustrating details of packet-transmission control processing that the packet buffer controller executes in response to a packet transmission trigger.
Figure 17:
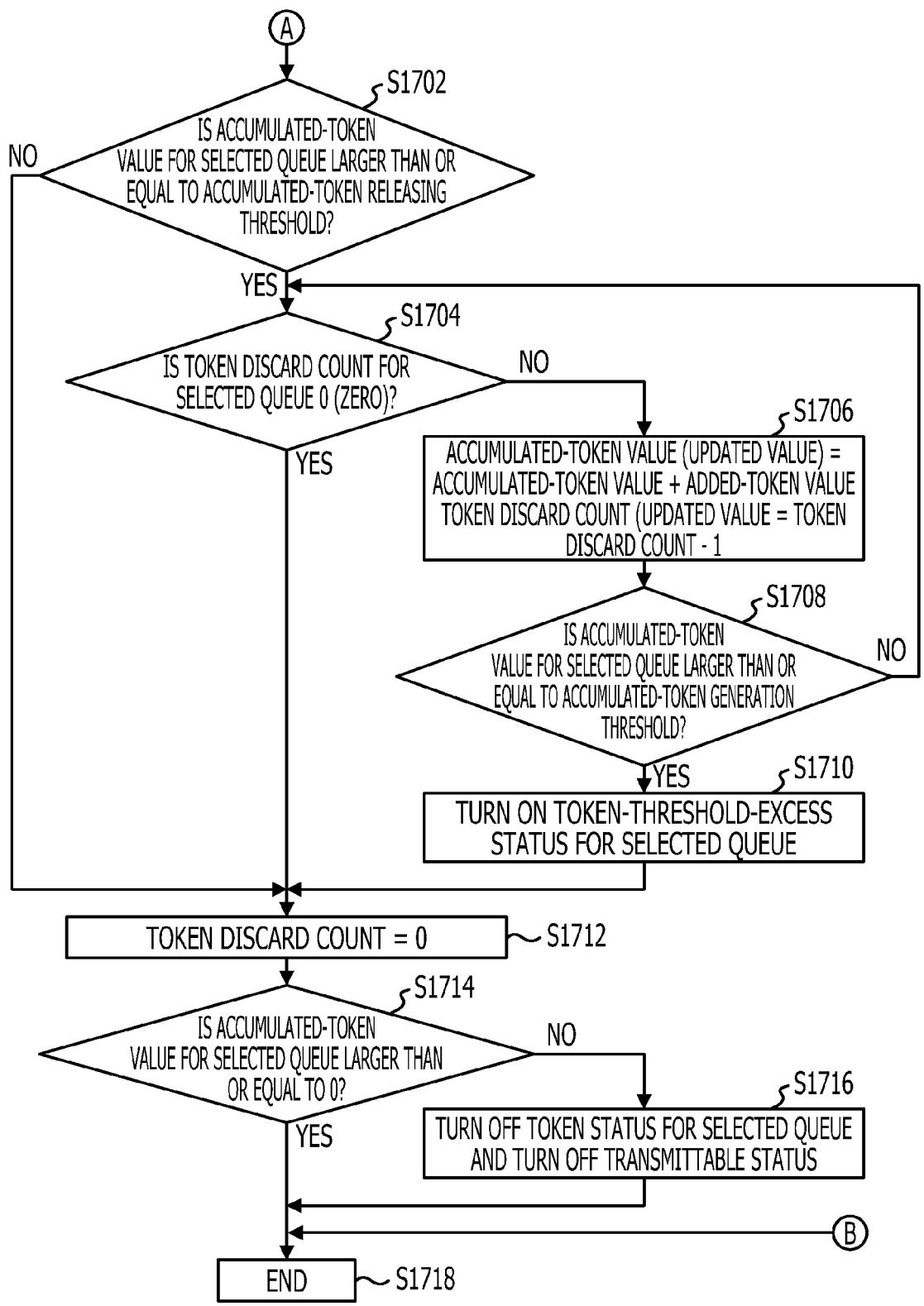
FIG. 17 is a flowchart illustrating details of the packet-transmission control processing that the packet buffer controller executes in response to the packet transmission trigger.

FIGS. 16 and 17 are flowcharts illustrating details of packet-transmission control processing that the packet buffer controller 1310 executes in response to a packet transmission trigger.

The processing from operations S1602 to S1612 is analogous to the processing from operations S802 to S812 illustrated in FIG. 8, except that the token discard count is used instead of the token addition count. Hence, a detailed description of the processing is not given hereinafter. When it is determined in operation S1608 that a queue whose transmittable flag in the transmittable-status flag 524 is in the ON state does not exist, the process proceeds to operation S1718. After operation S1612, the process proceeds to operation S1614.

The processing from operations S1614 to S1618 is analogous to the processing from operations S812 to S818 illustrated in FIG. 8, except that the token addition count is not reset in operation S1614. Hence, a detailed description of the processing is not given hereinafter. After operations S1616 and S1618, the process proceeds to operation S1620.

The processing from operations S1620 and S1622 is analogous to the processing from operations S1220 and S1222 illustrated in FIG. 12, except that the accumulated-token releasing thresholds are used instead of the accumulated-token thresholds. Hence, a detailed description of the processing is not given hereinafter. After operations S1620 and S1622, the process proceeds to operation S1702.

In operation S1702, the token controller 1312 in the bandwidth controller 1302 refers to the token-threshold table 1320 to obtain the accumulated-token releasing threshold for the selected queue. The token controller 1312 then determines whether or not the accumulated-token value (the updated value) for the selected queue after the update performed in operation S1614 is larger than or equal to the obtained accumulated-token releasing threshold. When the accumulated-token value for the selected queue is larger than or equal to the accumulated-token releasing threshold, the process proceeds to operation S1704. When the result of the determination indicates that the accumulated-token value for the selected queue is smaller than the accumulated-token releasing threshold, the process proceeds to operation S1712.

In operation S1704, the status monitor 1322 refers to the count value of the trigger counter 1326 (i.e., the token discard count) for the selected queue to thereby obtain the token discard count for the selected queue. The status monitor 1322 then determines whether or not the value of the token discard count for the selected queue is 0 (zero). When the value of the token discard count for the selected queue is not 0 (zero), i.e., is 1 or more, the process proceeds to operation S1706. When the result of the determination indicates that the value of the token discard count for the selected queue is 0 (zero), the process proceeds to operation S1712.

In operation S1706, the token controller 1312 refers to the token table 514 to obtain the added-token value for the selected queue. On the basis of the token counters 518 for the selected queue, the token controller 1312 performs token addition processing by adding the obtained added-token value and the accumulated-token value for the selected queue after the update performed in operation S1614. The status monitor 1322 also decrements the value of the token discard count obtained in operation S1704 by 1, to thereby update the value of the token discard count.

In operation S1708, the token controller 1312 refers to the token-threshold table 1320 to obtain the accumulated-token generation threshold for the selected queue. The token controller 1312 then determines whether or not the accumulated-token value (the updated value) for the selected queue after the token addition processing was performed in operation S1706 is larger than or equal to the obtained accumulated-token generation threshold. When the result of the determination indicates that the accumulated-token value (the updated value) is larger than or equal to the accumulated-token generation threshold, the process proceeds to operation S1710. When the accumulated-token value (the updated value) is smaller than the accumulated-token generation threshold, the process returns to operation S1704.

In operation S1710, the token controller 1312 determines that a sufficient amount of tokens is stored in the selected queue and sets the token-threshold-excess status signal for the selected queue to an ON state (e.g., a high level). Upon the change of the token-threshold-excess status signal to the ON state, the status monitor 1322 sets, in the token-threshold-excess status flag 934, the threshold-excess flag for the selected queue to the ON state.

In operation S1712, the status monitor 1322 determines that the token addition processing has been completed and resets the token discard count by clearing the count value of the trigger counter 1326 (i.e., the token discard count) for the selected queue (i.e., setting the count value to 0 (zero)).

The processing from operations S1714 to S1718 is analogous to the processing from operations S820 to S824 illustrated in FIG. 8. Hence, a detailed description of the processing is not given hereinafter.

In the above-described series of processing in operations S1602 to S1622 and operations S1702 to S1718, during selection of the transmission-source queue upon reception of the packet transmission trigger, the packet buffer controller 1310 can determine whether or not the priority control is to be performed, in accordance with the token discard count for each queue. Thus, with respect to each queue, it is possible to appropriately perform the priority control according to the duration time of the transmittable state of the queue.

With this arrangement, under the situation in which an insufficient transmission bandwidth of the corresponding output port (physical line) causes any of the queues to wait for packet transmission even when the queue is in the transmittable state, the queue whose duration time of the transmittable state is greater can also be preferentially selected as a transmission source. Hence, it is possible to inhibit an increase in the amount of data burst-transferred during packet transmission, the burst transfer resulting from an increase in the amount of tokens accumulated for each queue (i.e., an increase in the accumulated-token value), and it is also possible to inhibit an increase in packet-transmission fluctuations during the burst transfer.

In addition, even after the packet data is output from the selected queue, the packet-buffer controller 1310 can appropriately set the state of the transmittable status flag for each queue.

In addition, after outputting the packet data from the selected queue upon receiving the packet transmission trigger, the packet buffer controller 1310 can determine, for each queue, whether or not the token addition processing is to be performed, on the basis of the amount of accumulated tokens (i.e., the accumulated-token value) and the amount of discarded tokens (i.e., the token discard count). Thus, with respect to the queue from which the packet data was transmitted, some or all of the tokens that were supposed to be added but were discarded without being added can be added and accumulated at a later time.

Accordingly, even under a situation in which an insufficient transmission bandwidth of the corresponding output port (physical line) causes any of the queues to wait for packet transmission when the queue is in the transmittable state, the amount of tokens accumulated for each queue can be substantially increased. Thus, it is possible to inhibit a decrease in the data transfer rate of the packet data.

[3-2-4. Modification of Packet-Buffer Controller]

As in the case of the first and second embodiments, the packet transmission control processing illustrated in FIGS. 14 to 17 may also be realized with software, instead of the hardware illustrated in FIG. 13, by causing a program to execute the various types of processing illustrated in FIGS. 14 to 17.

In such a case, the packet-buffer controller 1310 may include, for example, a program memory for storing a program (a packet buffer control program) that implements the processing in the operations illustrated in FIGS. 14 to 17, a processor that can execute the program, and a work memory that provides a work area for computation processing performed by the processor.

By using the work memory to execute the packet buffer control program stored in the program memory, the processor in the packet buffer controller 1310 can execute processing that is equivalent to the processing executed by cooperation of the elements (illustrated in FIG. 4) in the packet-buffer controller 1310.

Although the packet transmission device and the packet transmission method according to the illustrative embodiments of the present disclosure have been described above, the present disclosure is not limited to the disclosed embodiments and various changes and modifications can be made thereto without departing from the scope of the appended claims. The technologies disclosed in the embodiments described above can be arbitrarily combined unless such a combination has a contradiction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet transmission device comprising:
   a buffer that includes queues and that stores packet data in any of the queues;
   a queue manager that outputs queue-status signals, each indicating whether transmittable packet data exists in one of the queues corresponding with the buffer;
   a bandwidth controller that accumulates tokens for each queue at a certain period and that outputs token-status signals for respective queues, each token-status signal indicating whether an amount of the tokens accumulated for a corresponding queue is larger than a token threshold associated with the corresponding queue;
   a queue selector that preferentially selects a queue whose duration time of a transmittable state, in which the corresponding queue status signal indicates that transmittable packet data exists in the corresponding queue and the corresponding token-status signal indicates that the amount of the accumulated tokens is larger than the token threshold associated with the corresponding queue, is greater than a duration-time threshold associated with the corresponding queue; and
   a buffer reader that controls reading of the packet data from the selected queue.

2. The packet transmission device according to claim 1, wherein the bandwidth controller includes token counters associated with respective queues, each token counter counting the amount of the accumulated tokens by adding a corresponding token value in response to a trigger signal having the certain period, and
   wherein the queue selector includes
      trigger counters associated with the respective queues, each trigger counter counting the number of triggers of the trigger signal when the corresponding queue is in the transmittable state, and
      a queue selection controller that selects, from the queues, any queue whose count value of the trigger counter is larger than the count value for the corresponding duration-time threshold.

3. The packet transmission device according to claim 2, wherein the queue selector includes an alarm notifying section that generates an alarm notification signal with respect to, a queue whose count value of the trigger counter is larger than an alarm notification threshold.

4. The packet transmission device according to claim 1, wherein the bandwidth controller includes
   a threshold storage section that stores accumulated-token thresholds for respective amounts of the accumulated tokens, the accumulated-token thresholds being set for the respective queues, and
   a token controller that outputs token-threshold-excess status signals, each indicating whether the corresponding amount of tokens is larger than or equal to the accumulated-token threshold, and wherein the queue selector includes a queue selection controller that selects, from the queues, a queue whose status is in the transmittable state and whose token-threshold-excess status signal indicates that the amount of the accumulated tokens is larger than the corresponding accumulated-token threshold.

5. The packet transmission device according to claim 1, wherein the bandwidth controller includes
token counters associated with the respective queues, each token counter counting the amount of the accumulated tokens by adding a corresponding token value in response to a trigger signal having the certain period,
a threshold storage section that stores accumulated-token generation thresholds and accumulated-token releasing thresholds for the respective amounts of the accumulated tokens, the accumulated-token generation thresholds and the accumulated-token releasing thresholds being set for the respective queues, and
a token controller that outputs token-threshold-excess status signals, each indicating whether or not the corresponding amount of the accumulated tokens is larger than the corresponding accumulated-token generation threshold, and
wherein the queue selector includes
trigger counters associated with the respective queues, each trigger counter counting the number of triggers of the trigger signal when the corresponding queue is in the transmittable state and the token-threshold-excess status signal for the queue indicates that the amount of the accumulated tokens is larger than the accumulated-token generation threshold, and
a queue selection controller that selects, from the queues, any queue whose count value of the trigger counter is larger than the count value corresponding to the duration-time threshold.

6. The packet transmission device according to claim 5, wherein the token controller in the bandwidth controller updates the amount of the accumulated tokens by reducing the count value of the token counter for the selected queue in accordance with a packet length of the packet data read from the selected queue, and
when the updated amount of the tokens is larger than the accumulated-token releasing threshold, the token controller increases the count value of the token counter for the selected queue in accordance with the count value of the trigger counter for the selected queue.

7. The packet transmission device according to claim 6, wherein the queue selector further includes a status monitor that monitors the count values of the trigger counters as the duration times of the transmittable states of the queues, and
the status monitor reduces the count value of the trigger count for the selected queue in accordance with an amount of increase in the count value of the token counter for the selected queue.

8. The packet transmission device according to claim 5, wherein each of the token counters stops the counting when the corresponding token-threshold-excess status signal indicates that the amount of the accumulated tokens is larger than the accumulated-token generation threshold and the corresponding queue-status signal indicates that transmittable packet data exists in the queue.

9. The packet transmission device according to claim 1, wherein, when a number of queues whose duration times is greater than the corresponding duration-time thresholds is two or more, the queue selector selects one of the two or more queues on a round robin basis.

10. The packet transmission device according to claim 1, wherein, when a queue whose duration time is greater than the duration-time threshold does not exist in the queues, the queue selector selects any queue in the selectable state from the queues.

11. The packet transmission device according to claim 1, wherein the bandwidth controller includes:
token counters associated with the respective queues, each token counter counting the amount of the accumulated tokens by adding a corresponding token value in response to a trigger signal having the certain period;
a maximum-value storage section that stores maximum values of the amounts of the accumulated tokens, the maximum values being set for the respective queues; and
a token controller that increases the count value of the token counter for the selected queue so that the count value does not exceed the corresponding maximum value.

12. The packet transmission device according to claim 1, further comprising a threshold storage section that stores the duration-time threshold.

13. A memory control circuit that controls a memory that stores packet data in any of queues, the circuit comprising:
a queue manager that outputs queue-status signals, each indicating whether transmittable packet data exists in a corresponding queue;
a bandwidth controller that accumulates tokens for each queue at a certain period and that outputs token-status signals for the respective queues, each token-status signal indicating whether an amount of the tokens accumulated for the corresponding queue is larger than a token threshold associated with the corresponding queue; and
a queue selector that preferentially selects a queue whose duration time of a transmittable state, in which the corresponding queue status signal indicates that transmittable packet data exists in the corresponding queue and the corresponding token-status signal indicates that the amount of the accumulated tokens is larger than the token threshold associated with the corresponding queue, is greater than a duration-time threshold associated with the corresponding queue.

14. A packet transmission method comprising:
storing packet data in any of queues in a buffer memory;
determining, for each queue, whether the packet data is stored therein;
accumulating tokens for each queue at a certain period;
determining, for each queue, whether an amount of the accumulated tokens accumulated is larger than a token threshold associated with the queue;
monitoring, for each queue, a duration time of a transmittable state in which the transmittable packet data is stored in the queue and the amount of the accumulated tokens is larger than the token threshold associated with the queue;
selecting, from the queues, any queue whose duration time is greater than a duration-time threshold associated with the queue; and
reading the packet data from the selected queue.

15. The packet transmission method according to claim 14, wherein the selecting the queue whose duration time is greater than the duration-time threshold provided is performed upon generation of a packet transmission trigger.

* * * * *

UNITED STATES PATENT AND TRADEMARK OFFICE
CERTIFICATE OF CORRECTION

PATENT NO.        : 8,737,227 B2
APPLICATION NO.   : 13/555809
DATED             : May 27, 2014
INVENTOR(S)       : Hata et al.

Page 1 of 1

It is certified that error appears in the above-identified patent and that said Letters Patent is hereby corrected as shown below:

In the Claims

Column 39, Line 63, Claim 9, delete "anumber" and insert -- a number --, therefor.

Signed and Sealed this
Thirtieth Day of September, 2014

Michelle K. Lee
*Deputy Director of the United States Patent and Trademark Office*